(12) United States Patent
Sato

(10) Patent No.: US 6,445,815 B1
(45) Date of Patent: Sep. 3, 2002

(54) MEASUREMENT OF DEPTH IMAGE CONSIDERING TIME DELAY

(75) Inventor: Kiyohide Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,859

(22) Filed: Mar. 12, 1999

(30) Foreign Application Priority Data

May 8, 1998 (JP) ............................................. 10-126264

(51) Int. Cl.$^7$ ................................................. G06K 9/00

(52) U.S. Cl. ....................................... 382/154; 382/276

(58) Field of Search ................................ 382/154, 153, 382/173, 275, 276; 345/125, 419, 420, 421, 422, 423, 424, 848, 836, 156, 427; 356/602, 603, 389, 349

(56) References Cited

U.S. PATENT DOCUMENTS

| | | | | |
|---|---|---|---|---|
| 5,703,961 A | * | 12/1997 | Rogina et al. | 382/154 |
| 5,724,447 A | * | 3/1998 | Fukushima | 382/211 |
| 5,933,185 A | * | 8/1999 | Minami et al. | 348/42 |
| 5,995,649 A | * | 11/1999 | Marugame | 382/154 |
| 6,084,979 A | * | 7/2000 | Kanade et al. | 382/154 |

OTHER PUBLICATIONS

"CMU Video–Rate Stereo Machine", Mobile Mapping Symposium, May 24–26, 1995 Columbus, OH.
Sugaya, et al., "Realtime Delay–free Stereo for Mixed Reality System," Institute of Information Sciences and Electronics, University of Tsukuba and English Abstract.
Mark, et al., "Post–Rendering 3D Warping," Proceedings of 1997 Symposium on Interactive 3D Graphics, Providence, RI, Apr. 27–30, 1997, pp. 7–16.

* cited by examiner

Primary Examiner—Andrew W. Johns
Assistant Examiner—Seyed Azarian
(74) Attorney, Agent, or Firm—Fitzpatrick, Cella, Harper & Scinto

(57) ABSTRACT

An augmented reality presentation system that generates and presents a virtual image free from any latency from a real space. This system has a position/posture sensor for time-sequentially inputting viewpoint position/posture information, stereo cameras for inputting a continuous time sequence of a plurality of images, and an image processing apparatus. The image processing apparatus detects a continuous time sequence of depth images ID from the continuous time sequence of input stereo images, estimates the viewpoint position/posture of the observer at a future time at which a three-dimensional image will be presented to the observer, on the basis of changes in previous viewpoint position/posture input from the position/posture sensor, continuously warps the continuously obtained depth images to those at the estimated future viewpoint position/posture, and presents three-dimensional grayscale (or color) images generated according to the warped depth images to the observer.

49 Claims, 20 Drawing Sheets

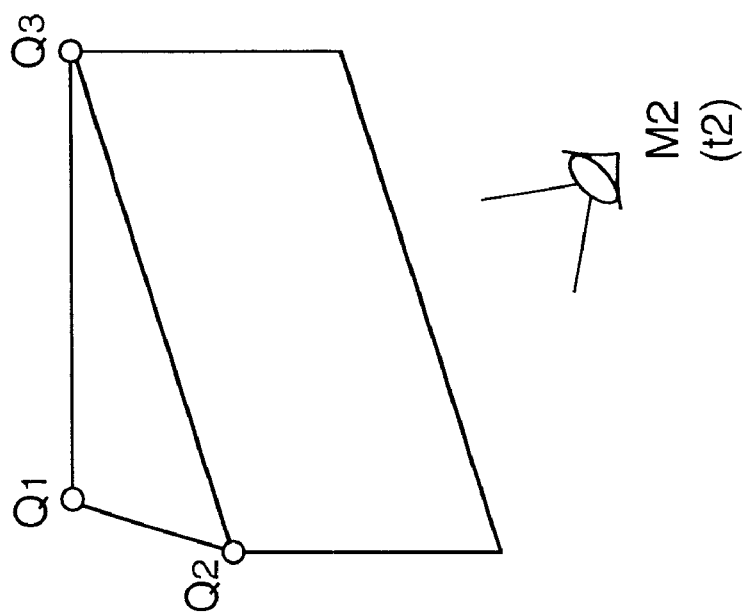
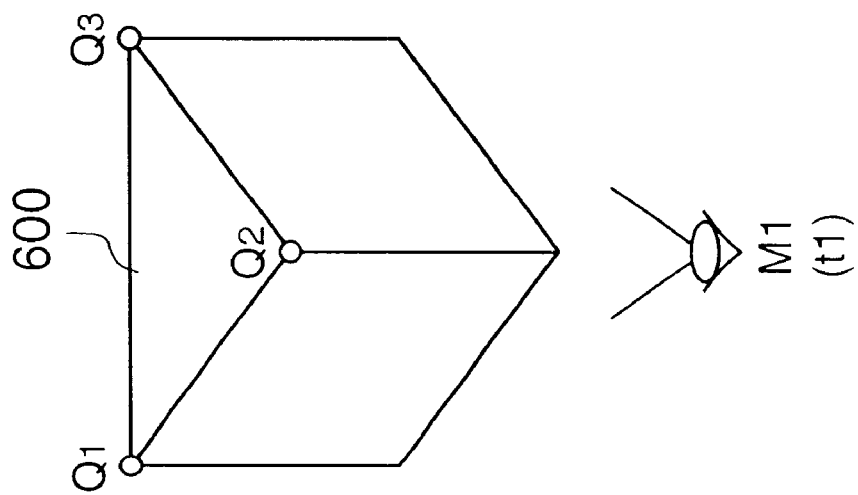
FIG. 19

MEASUREMENT OF DEPTH IMAGE CONSIDERING TIME DELAY

BACKGROUND OF THE INVENTION

The present invention relates to an image processing technique required for acquiring depth information of a real space in real time without any delay. The present invention also relates to an image merging technique required for providing a consistent augmented reality or mixed reality to the observer. The present invention further relates to a storage medium of a program for image processing.

For example, in an augmented or mixed reality presentation system using an optical see-through HMD (head mounted display) or the like, when a real world and virtual world are merged in a three-dimensionally matched form, the depth (front and behind) ordering of real objects and virtual objects must be correctly recognized to render the virtual objects in a form that does not conflict with that depth ordering. For this purpose, depth information (three-dimensional information) of the real world must be acquired, and that acquisition must be done at a rate close to real time.

Since the time required for forming or acquiring a depth image is not negligible, time lag or latency is produced between a real world and a video world presented to the observer on the basis of that depth image obtained a predetermined time ago. The observer finds this latency or time lag disturbing.

In order to remove such latency, conventionally, an attempt is made to minimize the delay time by high-speed processing. For example, in "CMU Video-Rate Stereo Machine", Mobile Mapping Symposium, May 24–26, 1995, Columbus, Ohio, images from five cameras are pipeline-processed to attain high-speed processing.

However, even by such high-speed processing, a delay time around several frames is produced. As a depth image obtained with a delay time of several frames does not reflect a change in real world that has taken place during that delay time (movement of an object or the observer), it does not accurately represent the actual (i.e., current) real world. Therefore, when the depth ordering of the real and virtual worlds is discriminated using this depth image, it produces inconsistency or conflict, and the observer experiences intolerable incoherence. In addition, high-speed pipeline processing is limited, and the delay time cannot be reduced to zero in principle.

This problem will be explained in detail below using FIG. 1. Assume that the observer observes the real world at the same viewpoint as that of a camera for the sake of simplicity.

Referring to FIG. 1, if reference numeral 400 denotes an object (e.g., triangular prism-shaped block) in a real space, an augmented reality presentation system (not shown) in this example, presents an augmented reality image in which a virtual object 410 (e.g., a columnar block) is merged to a position behind the real object 400 to the observer. The augmented reality presentation system generates a depth image of the real object 400 from images taken by a camera that moves together with the observer, and discriminates the depth ordering of the real object 400 and virtual object 410 on the basis of this depth image upon presenting an image of the virtual object 410.

Assume that the observer has moved his or her viewpoint to $P_1$, $P_2$, $P_3$, and $P_4$ in turn, and is currently at a viewpoint $P_5$. At the viewpoint $P_5$, the observer must be observing a scene $500_5$.

If a depth image of the scene $500_5$ (a depth image $510_5$ of the scene $500_5$ obtained by observation from the viewpoint $P_5$) is obtained, the augmented reality presentation system can generate a virtual image $410_5$ with an occluded portion 600, and can render these images in a correct occlusion relationship, i.e., can render a scene $520_5$ (FIG. 3) in which the virtual image 410 is partially occluded by the object 400.

However, since this augmented reality presentation system requires a time $\Delta t$ for its internal processing, a depth image to be used at the viewpoint $P_5$ for augmented reality presentation is the one at an old viewpoint $\Delta t$ before the viewpoint $P_5$ (the viewpoint $P_2$ in FIG. 1 will be used to express this old position for the sake of simplicity). That is, at the current time (i.e., the time of the viewpoint $P_5$ in FIG. 1), a depth image $510_2$ corresponding to a scene $500_2$ at the viewpoint $P_2$ $\Delta t$ before the current time can only be obtained.

At the viewpoint $P_2$, the object 400 could be observed at a rightward position as compared to the scene $500_5$, and its depth image $510_2$ could correspond to the scene $500_2$. Hence, when the depth ordering of the real and virtual worlds at the viewpoint $P_5$ is discriminated in accordance with this old depth image $510_2$, since a virtual image $410_2$ with an occluded portion 610, is generated, as shown in FIG. 4, an image of the front real object 400 is presented to the observer as the one which is occluded by the virtual image $410_2$ of the virtual object 410, and by contrast, an image of the virtual object 410 presented to the observer has a portion 610 which ought not to be occluded but is in fact occluded, and the virtual object 410 also has a portion 620 which ought to be occluded but is in fact not occluded, as shown in FIG. 5.

In this way, if augmented reality is presented while ignoring the time $\Delta t$ required for generating a depth image, an unnatural, contradictory world is presented.

As a prior art that points out problems with real-time stereo processing based on high-speed processing implemented by hardware, Yasuyuki Sugawa & Yuichi Ota, "Proposal of Real-time Delay-free Stereo for Augmented Reality" is known.

This article proposes predicting a future depth image. That is, this article proposes an algorithm that can reduce system latency from input to output as much as possible by executing high-speed disparity estimation that uses the stereo processing result of previous images and utilizes time correlation, parallel to disparity estimation by stereo.

However, this article is premised on used of a stationary camera, and cannot cope with a situation where the camera itself (i.e., a position/posture of viewpoint of the observer) moves.

SUMMARY OF THE INVENTION

The present invention has been made to solve the conventional problems, and has as its object to provide a depth image measurement apparatus and method, that can acquire a depth image of a real world in real time without any delay.

It is another object of the present invention to provide an image processing apparatus and method, which can present a three-dimensionally matched augmented reality image even when the viewpoint of the observer moves, and to provide an augmented reality presentation system and method.

It is still another object of the present invention to provide an image processing apparatus and method, which can present a three-dimensionally matched augmented reality image, continuously in particular, and to provide an augmented reality presentation system and method.

According to a preferred aspect of the present invention, the second viewpoint position at which the second depth image is to be generated is that of the image input means at the second time, to which the image input means has moved over a time elapsed from the first time at which the image input means input the stereo image.

According to a preferred aspect of the present invention, the second time is a time elapsed from the first time by a known first processing time required for depth image processing in the calculation means, and a second processing time required for depth image warping processing by the warping means.

According to a preferred aspect of the present invention, the image input means (or step) inputs a stereo image from stereo cameras.

According to a preferred aspect of the present invention, the depth image generation means (or step) generates the stereo image or first depth image by triangulation measurement.

The viewpoint position can be detected based on an image input by the image input means without any dedicated three-dimensional position/posture sensor. According to a preferred aspect of the present invention, the position information estimation means (or step) estimates changes in viewpoint position on the basis of the stereo image input from the stereo cameras attached to the observer.

The viewpoints can be accurately detected using a dedicated position/posture sensor. According to a preferred aspect of the present invention, the position information estimation means (or step) receives a signal from a three-dimensional position/posture sensor attached to the camera, and estimates changes in viewpoints on the signal.

According to a preferred aspect of the present invention, the depth image warping means (or step) calculates a coordinate value and depth value of one point on the second depth image, which corresponds to each point on the first depth image, by three-dimensional coordinate transformation on the basis of the viewpoint position/posture information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 19 is a view for explaining another viewpoint position/posture estimation method in the third embodiment;

DETAILED DESCRIPTION OF THE INVENTION

A depth image generating apparatus for generating a depth image according to a preferred embodiment of the present invention will be explained hereinafter with reference to the accompanying drawings.

<Principle>

Figure 6:
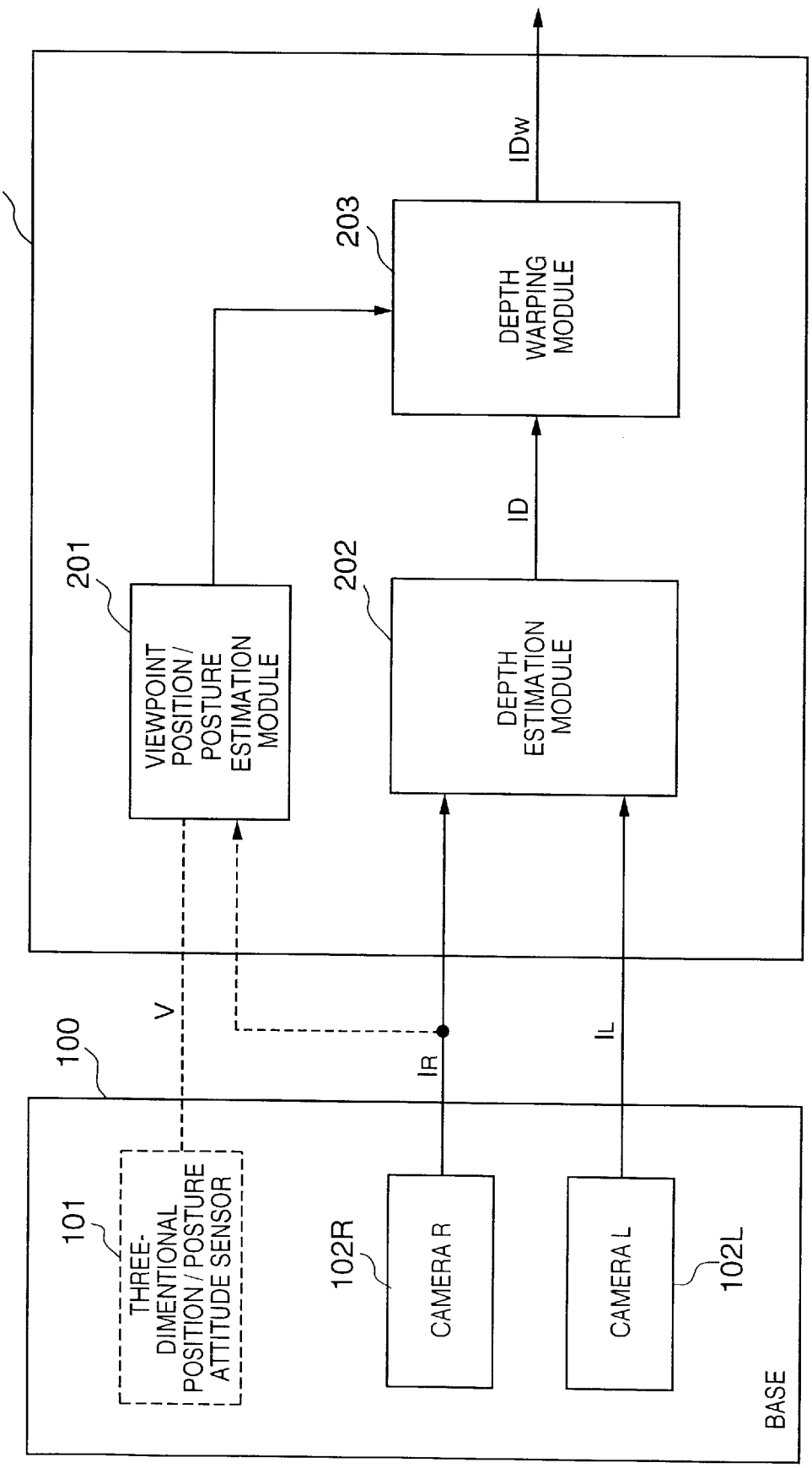
FIG. 6 is a block diagram of an image processing apparatus 200 according to an embodiment to which the present invention is applied and the first embodiment.

FIG. 6 shows a basic arrangement of a depth image generation apparatus, and mainly shows a depth image generation apparatus 200 having two cameras 102R and 102L mounted on a base 100.

The base 100 has the two cameras 102R and 102L for stereoscopically sensing a scene in front of them. Image signals $I_R$ and $I_L$ that represent an environmental scene of a real space sensed by the respective cameras at time $t_0$ are sent to the depth image generation apparatus 200. The depth image generation apparatus 200 has a depth estimation module 202 for receiving these image signals $I_R$ and $I_L$ and extracting a depth image ID (three-dimensional shape information Z) of the environmental scene, a module 201 for estimating the relative position/posture of the viewpoint of the camera 102R at future time $t_F$ ($=t_0+\Delta t$), and a depth warping module 203 for warping the depth image estimated by the module 202 to a depth image $ID_W$ at that viewpoint.

The viewpoint position/posture estimation module 201 outputs the relative position/posture of the viewpoint at time $t_F$ viewed from the viewpoint position/posture at time $t_0$ to the depth warping module 203.

The viewpoint position/posture estimation module 201 has two input routes. One input route receives position information (x, y, z) and posture information ($\omega$, $\psi$, $\kappa$) from a three-dimensional position/posture sensor 101 mounted on the base 100. Note that the position information (x, y, z) and posture information ($\omega$, $\psi$, $\kappa$) will be generally referred to as "position/posture information V" hereinafter. The other input route to the viewpoint position/posture estimation module 201 receives the image signal $I_R$ from the camera 102R.

The three-dimensional position/posture sensor 101 is mounted on the base 100, and is calibrated to output the viewpoint position/posture of the camera 102R. That is, the relative position relationship (offset) between the sensor itself and camera 102R is measured in advance, and this offset is added to the position/posture information of the sensor itself as its actual output, thus outputting the position/posture information V of the camera 102R.

When the viewpoint position/posture estimation module 201 receives the position/posture information V (x, y, z, $\omega$, $\psi$, $\kappa$) from the sensor 101, that information V represents the viewpoint position/posture of the camera 102R. On the other hand, when the viewpoint position/posture estimation module 201 receives the image signal $I_R$, it extracts the position/posture information V of the camera 102R from that image signal $I_R$. In this way, the viewpoint position/posture estimation module 201 time-sequentially extracts the position/posture information V of the camera 102R on the basis of the signal time-sequentially input from one of the sensor 101 and camera 102R.

Furthermore, the viewpoint position/posture estimation module 201 estimates a change $\Delta V$ in relative viewpoint position of the camera 102R at time $t_F$, viewed from the viewpoint position of the camera 102R at time $t_0$, on the basis of the time-sequentially extracted position/posture information V of the camera 102R, and outputs it.

The feature of the depth image generation apparatus 200 shown in FIG. 6 lies in that the change $\Delta V$ in viewpoint at arbitrary future time $t_F$ is estimated and a depth image $ID_W$ at that viewpoint position/posture is generated. The depth warping module 203 warps the depth image ID estimated by the depth estimation module 202 to generate a depth image $ID_W$. This warping will be explained in detail later.

Time $\Delta t$ can be arbitrarily set. Assume that image captured by the cameras 102 requires a processing time $\delta_1$, the depth estimation module 202 requires a processing time $\delta_2$, and the depth warping module 203 requires a processing time $\delta_3$. For example, by setting time $t_F$:

$$t_F = t_0 + \delta_1 + \delta_2 + \delta_3 = t_0 + \Delta t \quad (1)$$

for $\Delta t \equiv \delta_1 + \delta_2 + \delta_3$, the output time of the depth image $ID_W$ can be matched with time $t_F$ (that is, a depth image free from any delay can be obtained).

The basic principle of the depth image generating apparatus to which the present invention is applied has been described.

The image generating apparatus shown in FIG. 6 can improve processing efficiency by pipeline processing exploiting its hardware arrangement.

Figure 7:
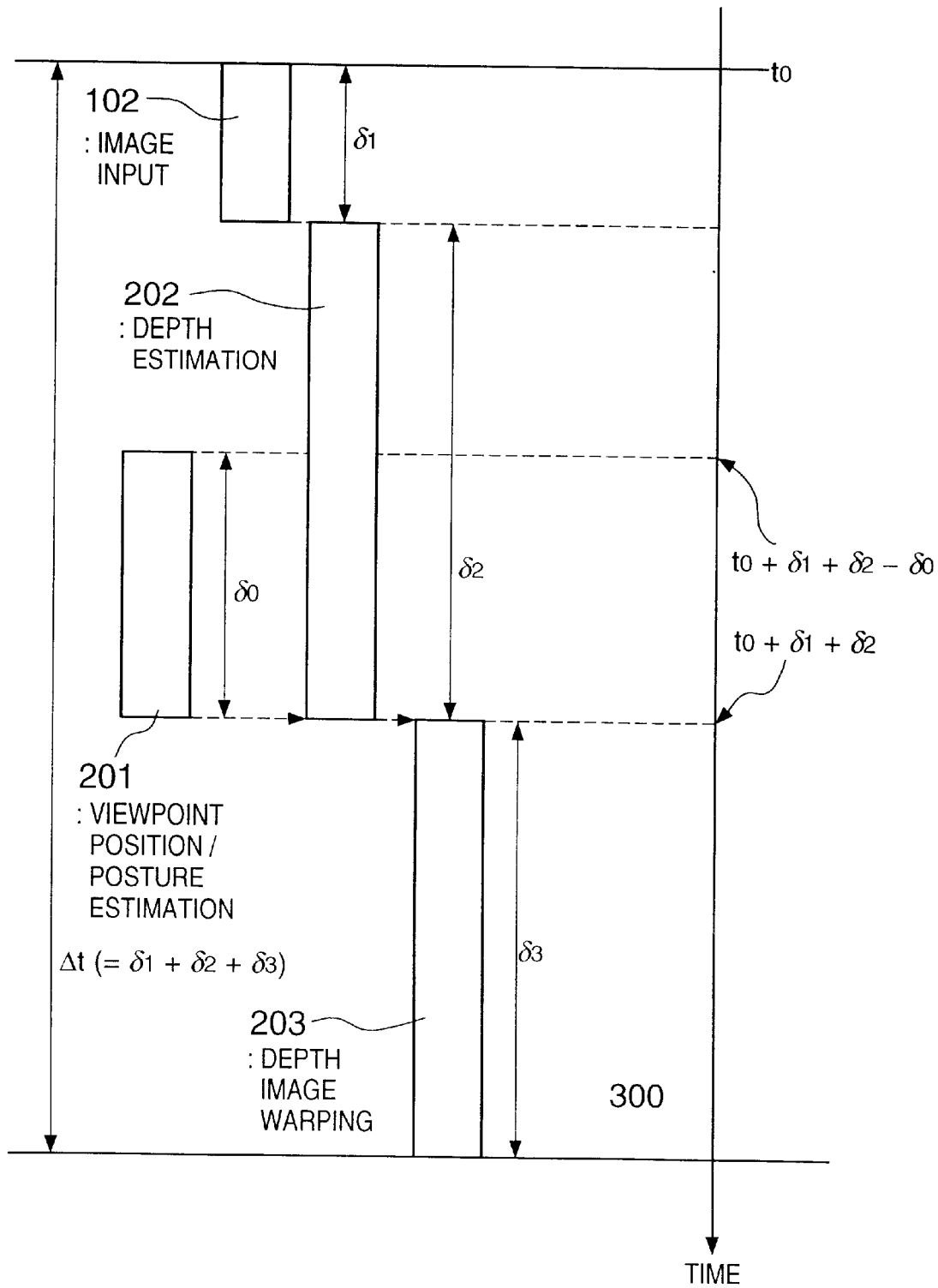
FIG. 7 is a timing chart for explaining the operation of the image processing apparatus 200 according to the embodiment and the first embodiment when the internal processing of the apparatus 200 is done in a pipeline fashion.

FIG. 7 shows the pipeline order when the pipeline processing is applied to the image generating apparatus shown in FIG. 6.

More specifically, at arbitrary time $t_0$ (assumed to be the current time), the two cameras 102 inputs two, right and left image signals $I_R$ and $I_L$. Assume that this input processing requires a time $\delta_1$. Then, at time $t_0+\delta_1+\delta_2$, the depth estimation module 202 outputs a depth image ID at time $t_0$ to the depth warping module 203.

On the other hand, the viewpoint position/posture estimation module 201 obtains the current viewpoint position/posture $V_{t0}$ from that image signal (or the signal from the position/posture sensor), estimates a viewpoint position/posture $V_{tF}$ $\Delta t$ after the current time from the locus of the viewpoint so far, and outputs a change $\Delta V$ in viewpoint position/posture between these two viewpoints. Assume that the position/posture estimation module 201 requires a time $\delta_0$ for this estimation (see FIG. 7) (at this time, assume that the time $\delta_0$ is sufficiently shorter than the time $\delta_2$). Hence, by starting a viewpoint position/posture estimation at time $t_0+\delta_1+\delta_2-\delta_0$, the change $\Delta V$ in viewpoints is output to the depth warping module 203 at time $t_0+\delta_1+\delta_2$.

When the timing at which the position/posture estimation module 201 outputs the estimation result cannot be synchronized with the timing at which the depth warping module 203 receives the estimation result, the position/posture estimation module 201 or depth warping module 203 may include a buffer memory for temporarily storing the estimation result.

The depth warping module starts warping at time $t_0+\delta_1+\delta_2$. More specifically, the depth warping module 203 starts processing for warping the estimated depth image ID at time $t_0$ by the depth estimation module 202 to a depth image at the estimated viewpoint at time $t_0+\Delta t$ by the position/posture estimation module 201. If the depth warping module 203 requires a time $\delta_3$ for the processing, it outputs the warped depth image $ID_W$ at time $t_0+\delta_1+\delta_2+\delta_3$.

As shown in FIG. 7, the position/posture estimation module 201 and depth estimation module 202 execute parallel processes.

On the other hand, the processes of the depth estimation module 202 and depth warping module 203 can be coupled in a pipeline fashion.

More specifically, when the depth image generation apparatus 200 is applied to a plurality of continuously input frame images, the depth estimation module 202 continuously and sequentially receives images. For example, when images are input at a rate of 30 frames/sec, the depth estimation module 202 must process, within the time $\delta_2$ required for the processing:

$$30 \times \delta_2 \text{ frames}$$

For this purpose, the depth estimation module 202 is further divided into a plurality of module units. If the module 202 is divided so that its processing is done by distributed processing using a maximum of $30 \times \delta_2$ module units, the depth estimation module 202 can continuously estimate depth images at the rate of 30 frames/sec. Similarly, the depth warping module is divided in accordance with the time $\delta_3$ required for its processing. With such divided module units, the depth image generation apparatus 200 of this embodiment can continuously execute two processes, i.e., depth estimation and depth warping, in a pipeline fashion.

When the divided module units must be synchronized, a buffer memory or memories can be appropriately added, as described above.

In FIG. 6, the depth estimation module 202 and depth warping module 203 generate a depth image on the basis of an image from one camera, but they may generate depth images on the basis of images from two cameras, depending on the purposes.

Also, in FIG. 6, the number of cameras 102 is not limited to two. In order to improve depth estimation precision, two or more cameras are preferably used.

The depth image generation apparatus 200 shown in FIG. 6 is designed to require the time duration $\Delta t$ the length of which is set $\delta_1+\delta_2+\delta_3$. However, ideally, the time duration $\Delta t$ should be determined depending on the time when a depth image is required by an application. However, estimation in the position/posture estimation module 201 suffers more errors as the time duration $\Delta t$ becomes larger, and this tendency becomes especially conspicuous when the moving speed of the observer is high or when the moving direction is random.

That is, both too small and large $\Delta t$ lead to an increase in error. More specifically, the time duration $\Delta t$ must be appropriately adjusted in correspondence with the use environment of that system or the purpose of an application which uses the output depth image. In other words, a depth image suffering least errors can be output by allowing the user to freely set optimal $\Delta t$.

How the apparatus of the embodiment shown in FIG. 6 removes conflict produced upon discriminating the depth ordering in the prior art that has been described above with the aid of FIG. 1 will be explained below.

In order to present augmented reality free from any conflict in terms of the depth ordering, a depth image at the viewpoint position/posture (a view-point $P_5$ in the example in FIG. 1) of the observer at the presentation time of the generated augmented reality image must be used. More specifically, if $\delta_4$ represents the processing time required from when the image processing apparatus shown in FIG. 6 outputs a warped depth image until an augmented reality image that takes that depth into consideration is presented to the observer, $\Delta t$ can be ideally set to be:

$$\Delta t = \delta_1 + \delta_2 + \delta_3 + \delta_4 \quad (2)$$

Figure 1:
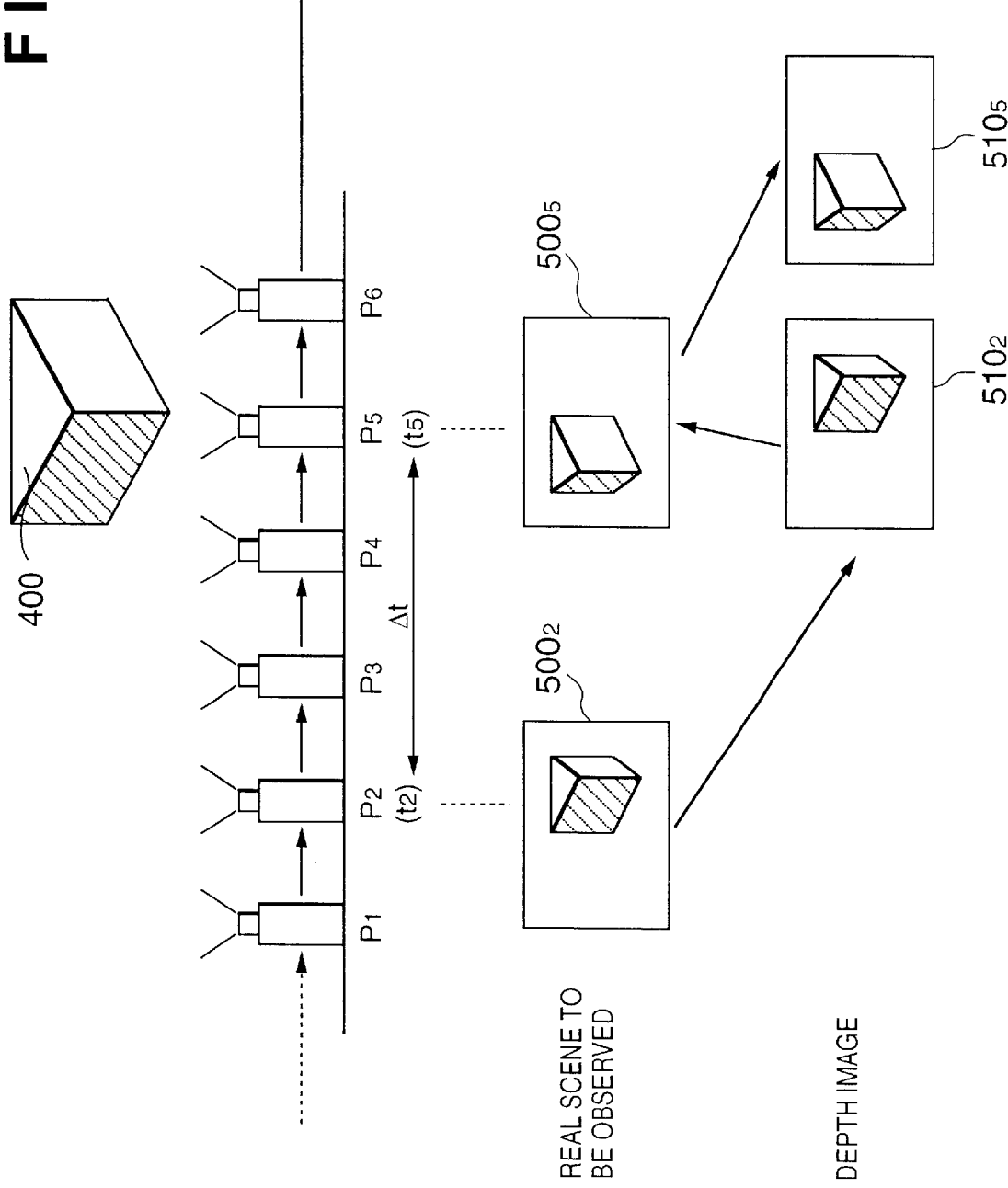
FIG. 1 is a view for explaining conflict or mismatching produced upon generating an augmented reality image based on a depth image obtained by a conventional method.
Figure 2:
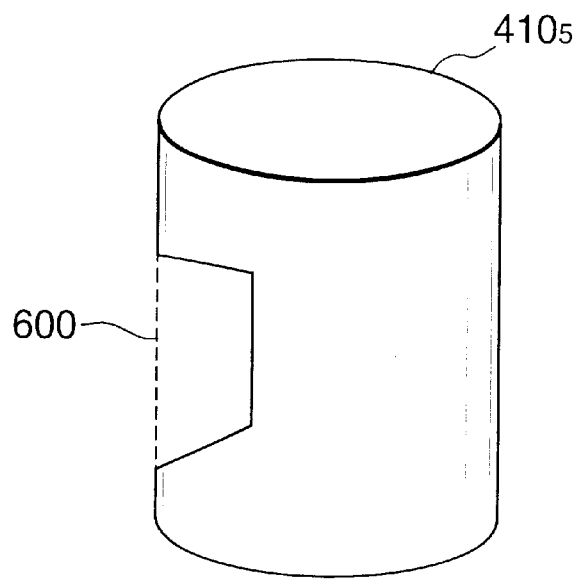
FIG. 2 is a view for explaining the reason why conflict or mismatching is not produced, assuming that the augmented reality image shown in FIG. 1 is free from any latency time.
Figure 3:
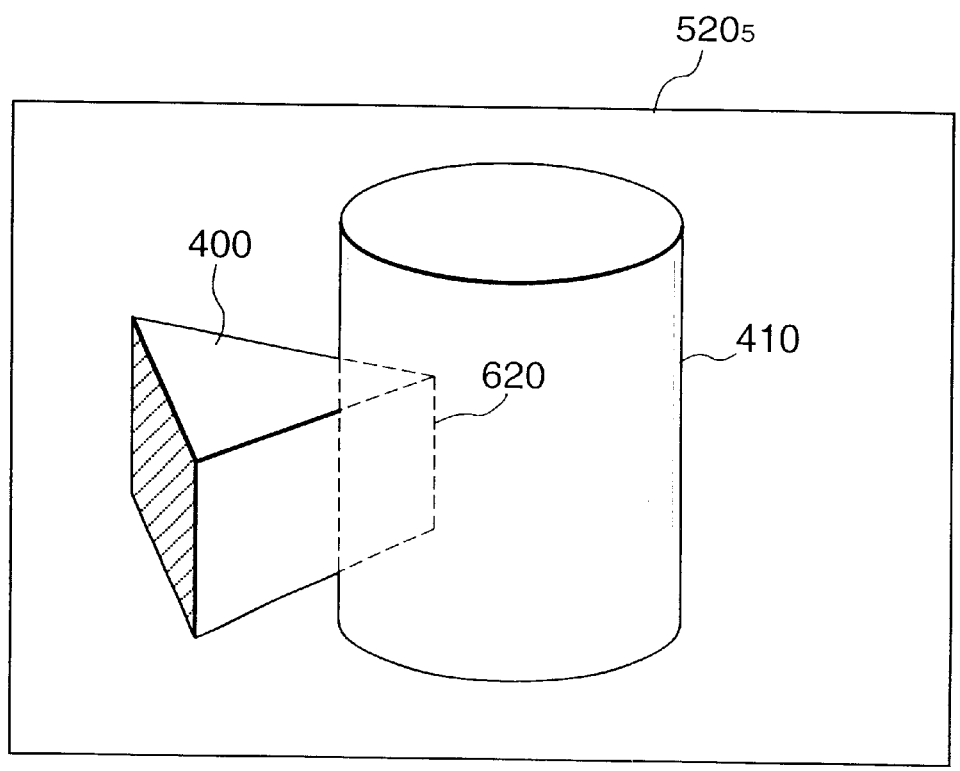
FIG. 3 is a view for explaining the reason why conflict or mismatching is not produced, assuming that the augmented reality image shown in FIG. 1 is free from any latency time.
Figure 4:
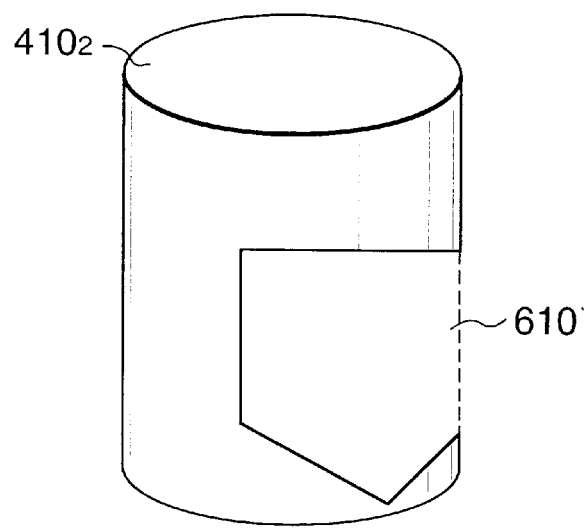
FIG. 4 is a view for explaining the reason why conflict or mismatching has been produced when the augmented reality image shown in FIG. 1 has latency time.
Figure 5:
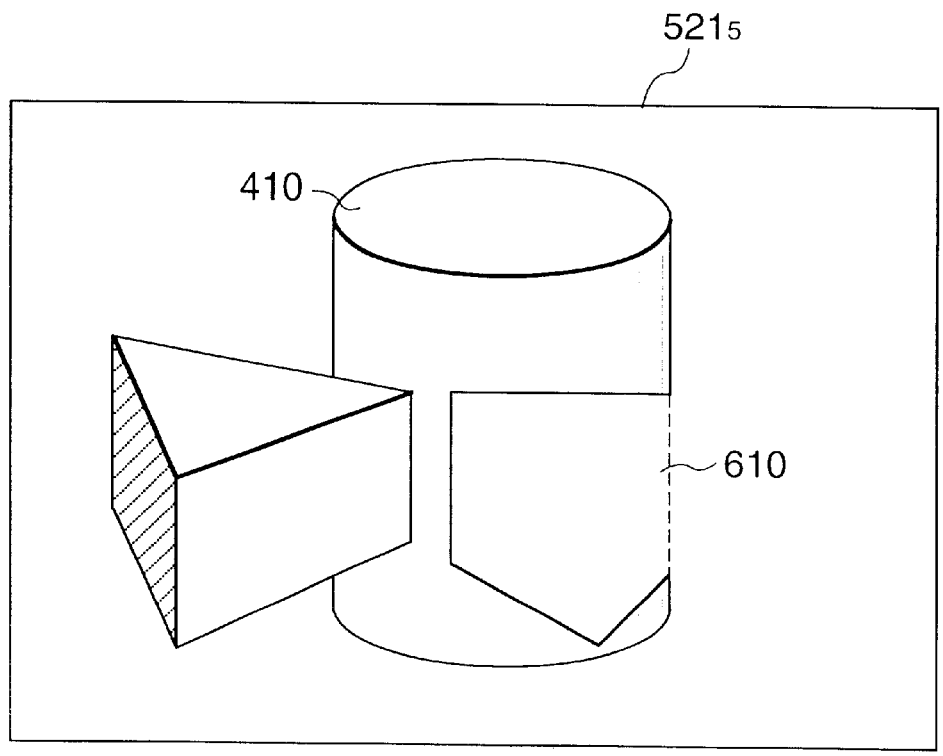
FIG. 5 is a view for explaining the reason why conflict or mismatching has been produced when the augmented reality image shown in FIG. 1 has latency time.

Thus, referring to FIG. 1, the current time is $t_5$ at the viewpoint $P_5$, and the time $t_2$ is $\Delta t$ prior to the current time. Then, the position/posture estimation module 201 in the image processing apparatus shown in FIG. 6 predicts a position/posture of viewpoint at the time $\Delta t$ after the current time, the prediction being made at time $t_2+\delta_1+\delta_2-\delta_0$ in FIG. 1. On the other hand, the depth warping module 203 warps a depth image $510_2$ at the viewpoint $P_2$ obtained by the depth estimation module 202 to a depth image which will be obtained at the predicted viewpoint (i.e., the viewpoint $P_5$) the time $\Delta t$ after the current time. Hence, the depth warping module 203 is expected to output the warped depth image (this depth image is similar to the depth image $510_5$) at time $t_5-\delta_4$. Hence, when a virtual object is rendered while discriminating the depth ordering based on this warped depth image, and is presented to the observer, an augmented reality image can be projected to the observer's eyes so that a virtual object 410 has correct depth ordering with a real object 400.

More specifically, in order to obtain an augmented reality free from any latency or time delay by measuring a depth image based on an image obtained by the moving camera, estimation of the depth image $510_5$ must be started at time $t_2$ the time duration $\Delta t$ required for the internal processing before time $t_5$. In other words, when an image is input from the camera at time $t_2$, the depth image $510_5$ starts to estimate the depth image $510_5$ of the real space at time $t_5$. The depth image generation apparatus 200 shown in FIG. 6 warps the depth image $510_2$ of an image input from the camera at time $t_2$, and uses the warped depth image as the depth image $510_5$ of the real space at time $t_5$.

<Embodiments>

Three embodiments of apparatuses to which the principle of the embodiment that has been described with reference to FIGS. 6 and 7 will be described below.

An apparatus of the first embodiment is a depth image generation apparatus that explains the principle of the embodiment shown in FIGS. 6 and 7 in more detail.

In apparatuses of the second and third embodiments, the principle of the embodiment that generates a depth image in real time without any latency or time lag from the real space is applied to an augmented reality presentation system. More specifically, the second embodiment is directed to an optical see-through augmented reality presentation system using an optical see-through HMD, and the third embodiment is directed to a video see-through augmented reality presentation system using a video see-through HMD.

<First Embodiment>

The arrangement and operation of the first embodiment will be explained below with the aid of FIG. 6.

FIG. 6 is a block diagram of a depth image generation apparatus of the first embodiment. In the aforementioned basic embodiment suggests applications with and without the three-dimensional position/posture sensor 101. In the description of the first embodiment, the three-dimensional position/posture sensor 101 is used.

<Operation of Viewpoint Position/Posture Estimation Module 201> . . . First Embodiment The operation of the position/posture estimation module 201 of the first embodiment will be described below.

The position/posture sensor 101 continuously outputs viewpoint position/posture information $V_{ts}$ of the camera 102 along a time axis $t_s$ of the sensor 101. The position/posture information $V_{ts}$ along the time axis $t_s$ of the sensor is given by:

$$V_{ts} = \{x_{ts}, y_{ts}, z_{ts}, \omega_{ts}, \psi_{ts}, \kappa_{ts}\} \quad (3)$$

Figure 8:
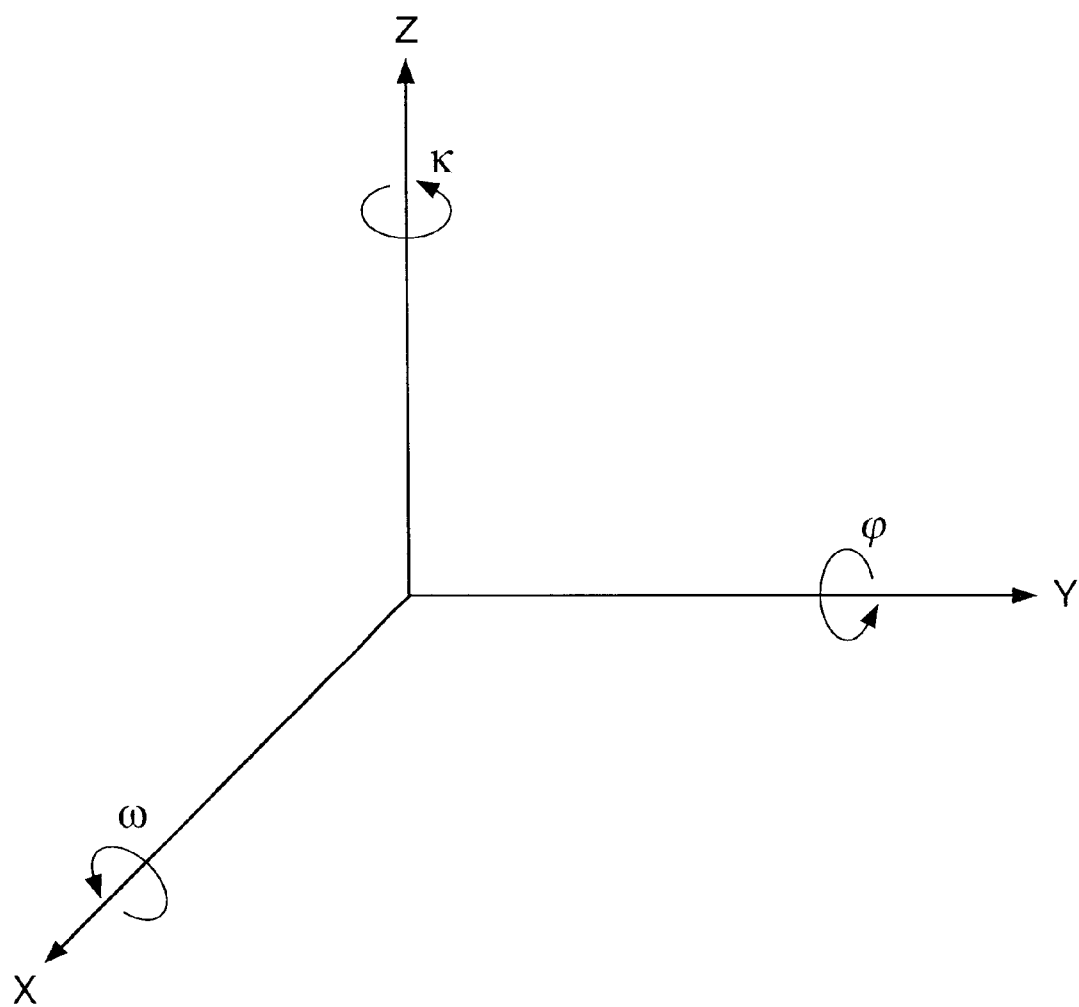
FIG. 8 is a view for explaining the relationship between positions (X, Y, Z) as well as postures ($\omega$, $\psi$, $\kappa$) of viewpoints in the embodiment, and the first to third embodiments.

Note that $\omega$, $\psi$, and $\kappa$ are respectively the rotational angles about the X-, Y-, and Z-axes, as shown in FIG. 8. A viewing transformation matrix (i.e., a transformation matrix from a world coordinate system to a camera coordinate system) $M_{ts}$ corresponding to such viewpoint position/posture Information $V_{ts}$ is given by:

$$M_{ts} = \begin{bmatrix} \cos\kappa_{ts} & -\sin\kappa_{ts} & 0 & 0 \\ \sin\kappa_{ts} & \cos\kappa_{ts} & 0 & 0 \\ 0 & 0 & 1 & 0 \\ 0 & 0 & 0 & 1 \end{bmatrix} \cdot \begin{bmatrix} 1 & 0 & 0 & 0 \\ 0 & \cos\omega_{ts} & -\sin\omega_{ts} & 0 \\ 0 & \sin\omega_{ts} & \cos\omega_{ts} & 0 \\ 0 & 0 & 0 & 1 \end{bmatrix} \cdot \begin{bmatrix} \cos\psi_{ts} & 0 & \sin\psi_{ts} & 0 \\ 0 & 1 & 0 & 0 \\ -\sin\psi_{ts} & 0 & \cos\psi_{ts} & 0 \\ 0 & 0 & 0 & 1 \end{bmatrix} \cdot \begin{bmatrix} 1 & 0 & 0 & -x_{ts} \\ 0 & 1 & 0 & -y_{ts} \\ 0 & 0 & 1 & -z_{ts} \\ 0 & 0 & 0 & 1 \end{bmatrix}. \quad (4)$$

Figure 9:
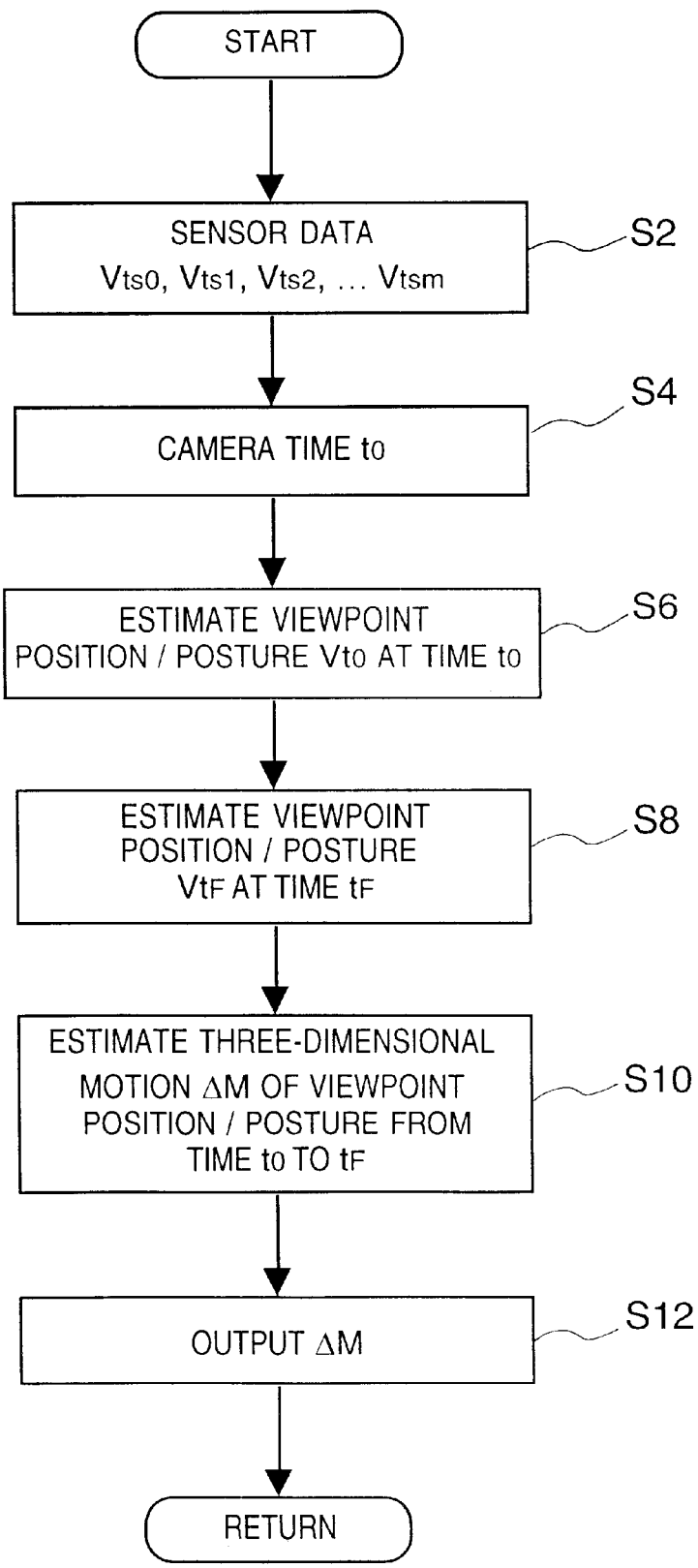
FIG. 9 is a flow chart showing the control sequence of a viewpoint position/posture estimation module 201 according to the first embodiment of the present invention.

FIG. 9 shows the control sequence of the viewpoint estimation module 201.

In step S2, position/posture information $V_{tsm}$ at current time $t_{sm}$ along the time axis of the sensor is input from the sensor 101. In this way, together with previously input position/posture information, a series of position/posture information is obtained:

$$V_{ts0}, V_{ts1}, V_{ts2}, \ldots, V_{tsm}$$

Figure 10:
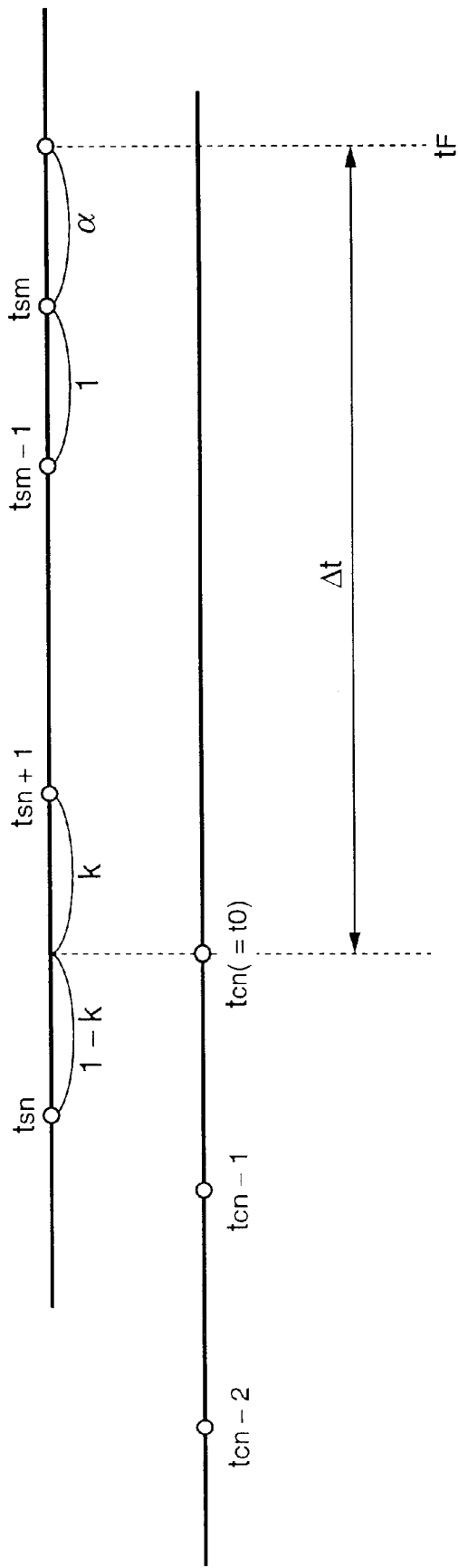
FIG. 10 is a view for explaining the principle of computation for synchronization when the sensor output and camera output are not synchronized in the first embodiment of the present invention.

The output from the position/posture sensor 101 is according to the time axis $t_s$. When the camera 102 is synchronized with the sensor 101, position/posture information at time $t_0$ at which the camera 102 captured the image can be directly used. On the other hand, when these two devices are not in phase, the position/posture information at time $t_0$ is calculated by interpolating position/posture information obtained from the sensor before and after that time. This interpolation can be implemented by, e.g., simple a 1st-order (linear) interpolation. More specifically, when time $t_0$ has a relationship with time $t_s$ of the sensor 101, as shown in FIG. 10, in step S4 using $t_{sn}$ and $t_{sn+1}$, and k ($0 \leq k \leq 1$), $t_0$ is given by:

$$t_0 = (1-k) \cdot t_{sn} + k \cdot t_{sn+1} \tag{5}$$

Solving equation (5) yields k. That is, k represents the relationship between the time systems of the camera and sensor. In step S6, a position $V_{t0}$ of the camera 102R at time $t_0$ is calculated according to equation (6) below using the obtained k:

$$V_{t0} = \{x_{t0}, y_{t0}, z_{t0}, \omega_{t0}, \psi_{t0}, \kappa_{t0}\}$$

where $$x_{t0} = (1-k) \cdot x_{tsn} + k \cdot x_{tsn+1}$$
$$y_{t0} = (1-k) \cdot y_{tsn} + k \cdot y_{tsn+1}$$
$$z_{t0} = (1-k) \cdot z_{tsn} + k \cdot z_{tsn+1}$$
$$\omega_{t0} = (1-k) \cdot \omega_{tsn} + k \cdot \omega_{tsn+1}$$
$$\psi_{t0} = (1-k) \cdot \psi_{tsn} + k \cdot \psi_{tsn+1}$$
$$\kappa_{t0} = (1-k) \cdot \kappa_{tsn} + k \cdot \kappa_{tsn+1} \tag{6}$$

Subsequently, in step S8, position/posture information $V_{tF}$ of the camera 102R at time $t_F$ ($=t_0+\Delta t$) is estimated.

Assume that the position/posture information of the camera 102R is obtained up to $t_{sm}$ as a position series, as shown in FIG. 10. If time $t_F$ is given by:

$$t_F = t_{sm} + \alpha \cdot \Delta t_s \tag{7}$$

(for $\Delta t_s = t_{sm} - t_{sm-1}$), $\alpha$ can be determined from this relationship. In step S8, the viewpoint position/posture information $V_{tF}$ of the camera 102R at time $t_F$ is given, using, e.g., 1st-order linear prediction, by:

$$V_{tF} = \{x_{tF}, y_{tF}, z_{tF}, \omega_{tF}, \phi_{tF}, \kappa_{tF}\} \tag{8}$$

where $$x_{tF} = x_{sm} + \alpha \cdot (x_{sm} - x_{sm-1})$$
$$y_{tF} = y_{sm} + \alpha \cdot (y_{sm} - y_{sm-1})$$
$$z_{tF} = z_{sm} + \alpha \cdot (z_{sm} - z_{sm-1})$$
$$\omega_{tF} = \omega_{sm} + \alpha \cdot (\omega_{sm} - \omega_{sm-1})$$
$$\phi_{tF} = \phi_{sm} + \alpha \cdot (\phi_{sm} - \phi_{sm-1})$$
$$\kappa_{tF} = \kappa_{sm} + \alpha \cdot (\kappa_{sm} - \kappa_{sm-1})$$

Note that the viewpoint having position/posture value $V_{tF}$ may be estimated by 2nd-order linear prediction or other prediction methods.

Finally, in step S10, a three-dimensional motion of the viewpoint position of the camera from time $t_0$ to time $t_F$ is estimated. This three-dimensional motion is represented by a matrix $\Delta M$ given by:

$$\Delta M = M_{tF} \cdot (M_{t0})^{-1} \tag{9}$$

where $M_{t0}$ is the transformation matrix from the world coordinate system into the camera coordinate system of the camera 102R at time $t_0$, and $M_{tF}$ is the transformation matrix from the world coordinate system of the camera 102R at time $t_F$. Also, $(M_{t0})^{-1}$ is the inverse matrix of $M_{t0}$. More specifically, $\Delta M$ is the transformation matrix from the camera coordinate system of the camera 102R at time $t_0$ to the camera coordinate system of the camera 102R at time $t_F$.

In step S12, this transformation matrix $\Delta M$ is output.

<Depth Estimation Module 202> . . . First Embodiment

The depth estimation module 202 receives image signals $I_R$ and $I_L$ from the cameras 102R and 102L, and calculates depth information by known triangulation measurement.

Figure 11:
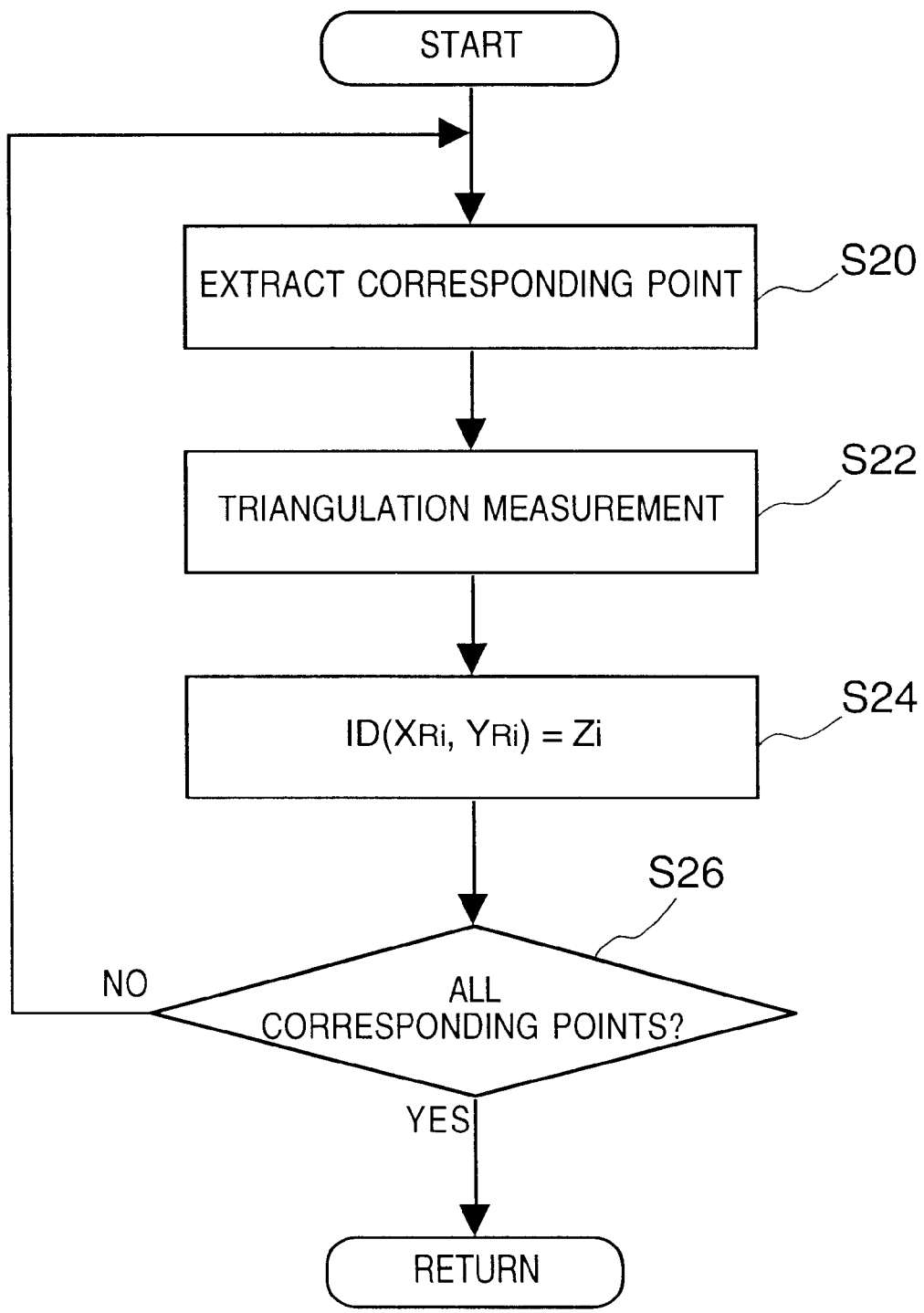
FIG. 11 is a flow chart for explaining the operation sequence of a depth estimation module 202 according to the first embodiment of the present invention.

FIG. 11 shows the control sequence of the depth estimation module 202. More specifically, in step S20, corresponding points existing between the two images $I_R$ and $I_L$ are extracted from the individual images. Pairs of corresponding points are pixels of points on the right and left images, which respectively correspond to a given point on an object. Such corresponding point pairs must be obtained by search in correspondence with all the pixels or feature pixels in the images $I_R$ and $I_L$. In step S22, a depth value $Z_i$ of a given point viewed from the camera 102R is calculated using triangulation measurement method for a pair of pixels ($X_{Ri}$, $Y_{Ri}$) and ($X_{Li}$, $Y_{Li}$) as corresponding points in the images $I_R$ and $I_L$. In step S24, the obtained depth value $Z_i$ is stored in a coordinate position ($X_{Ri}$, $Y_{Ri}$) of the depth image ID.

The depth values for all the points are calculated by repeating a loop of steps S20 to S26. That is, the depth image ID is generated. The generated depth image ID is output to the depth warping module 203.

Note that the depth estimation module 202 can be implemented using, e.g., a method disclosed in "CMU Video-Rate Stereo Machine" mentioned above, an active range finder, or a scheme proposed by Yasuyuki Sugawa, et al., "Proposal of Real-time Delay-free Stereo for Augmented Reality" in addition to triangulation measurement.

<Depth Warping Module 203> . . . First Embodiment

As shown in FIG. 6, the depth warping module 203 warps the depth image ID at the viewpoint having position/posture value $V_{t0}$ received from the depth estimation module 202 to the depth image $ID_W$ at the viewpoint having position/posture value $V_{tF}$.

The principle of processing in the depth warping module 203 is as follows. That is, the basic operation of the depth warping module 203 is to inversely project the depth image ID acquired at the viewpoint having position/posture value $V_{t0}$ into a space, and to re-project it onto an imaging plane assumed at the viewpoint having position/posture value $V_{tF}$ (i.e., to give a depth value $Z_{Di}$ to a point ($x_i'$, $y_i'$) on an output image corresponding to the depth image $ID_W$).

Figure 12:
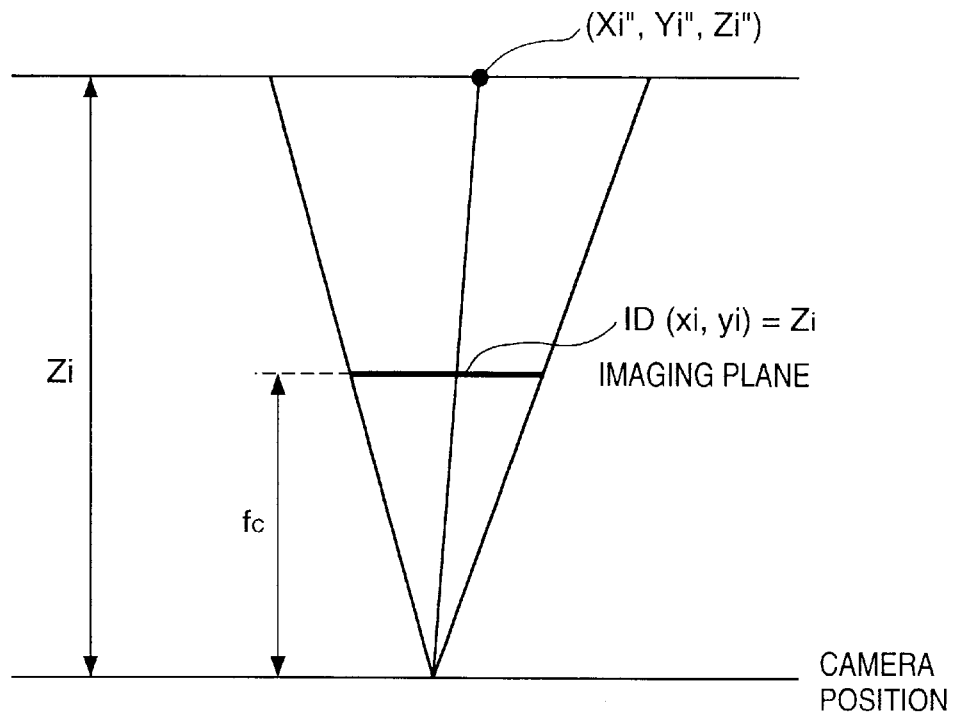
FIG. 12 is a view for explaining the operation principle of a depth warping module 203 of the first embodiment.
Figure 13:
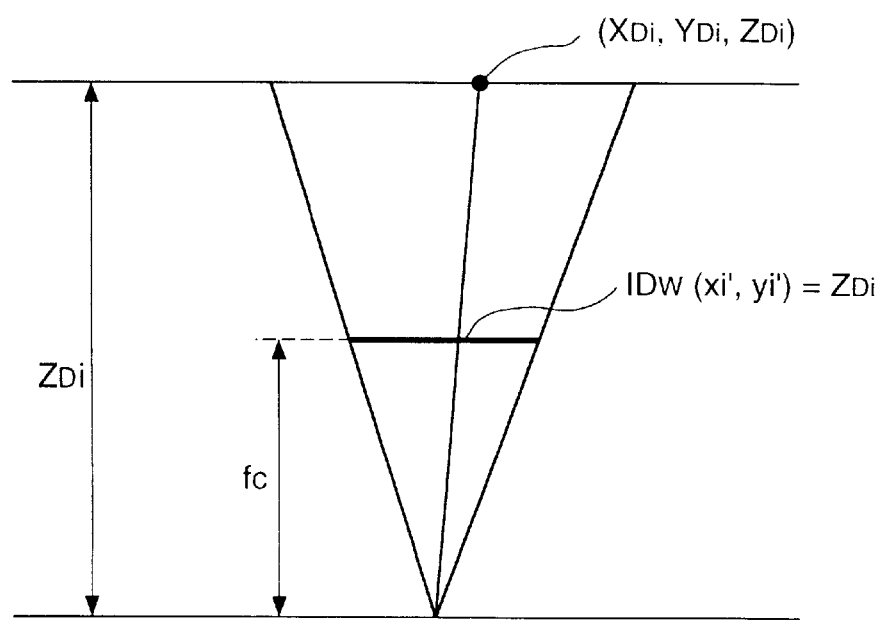
FIG. 13 is a view for explaining the operation principle of the depth warping module 203 of the first embodiment.

Let $f_c$ be the focal length of the camera 102. If an arbitrary point of the depth image ID has a value $Z_i = ID(x_i, y_i)$, this point ($x_i, y_i$) is transformed from a point ($x_i, y_i, f_c$) on the imaging plane of the camera 102 into a point ($X_i''$, $Y_i''$, $Z_i''$) in a three-dimensional space on the camera coordinate system of the camera 102R at the viewpoint having position/ posture value $V_{tO}$ according to the equation below, i.e., as can be seen from FIG. 12:

$$(X_i'', Y_i'', Z_i'') = \left( x_i \cdot \frac{Z_i}{f_C}, y_i \cdot \frac{Z_i}{f_C}, Z_i \right) \quad (10)$$

As a result of a three-dimensional motion ΔM which moves the camera 102R from the viewpoint having position/posture value $V_{tO}$ to the viewpoint having position/posture value $V_{tF}$, this point $(X_i'', Y_i'', Z_i'')$ is expected to move to a position $(X_{Di}, Y_{Di}, Z_{Di})$ on the camera coordinate system at the viewpoint having position/posture value $V_{tF}$, which position is given by:

$$\begin{pmatrix} X_{Di} \\ Y_{Di} \\ Z_{Di} \end{pmatrix} = \Delta M \cdot \begin{pmatrix} X_i'' \\ Y_i'' \\ Z_i'' \end{pmatrix} \quad (11)$$

Since this camera has the focal length $f_c$, the point $(X_{Di}, Y_{Di}, Z_{Di})$ on the camera coordinate system at the viewpoint having position/posture value $V_{tF}$ is expected to be projected onto a point $(x_i', y_i')$ on the imaging plane given by:

$$\begin{pmatrix} x_i' \\ y_i' \end{pmatrix} = \begin{pmatrix} \frac{X_{Di}}{Z_{Di}} \cdot f_c \\ \frac{Y_{Di}}{Z_{Di}} \cdot f_c \end{pmatrix} \quad (12)$$

The depth warping module 203 outputs $ID_W(x_i', y_i') = Z_{Di}$ as the warped depth image $ID_W$.

Figure 14:
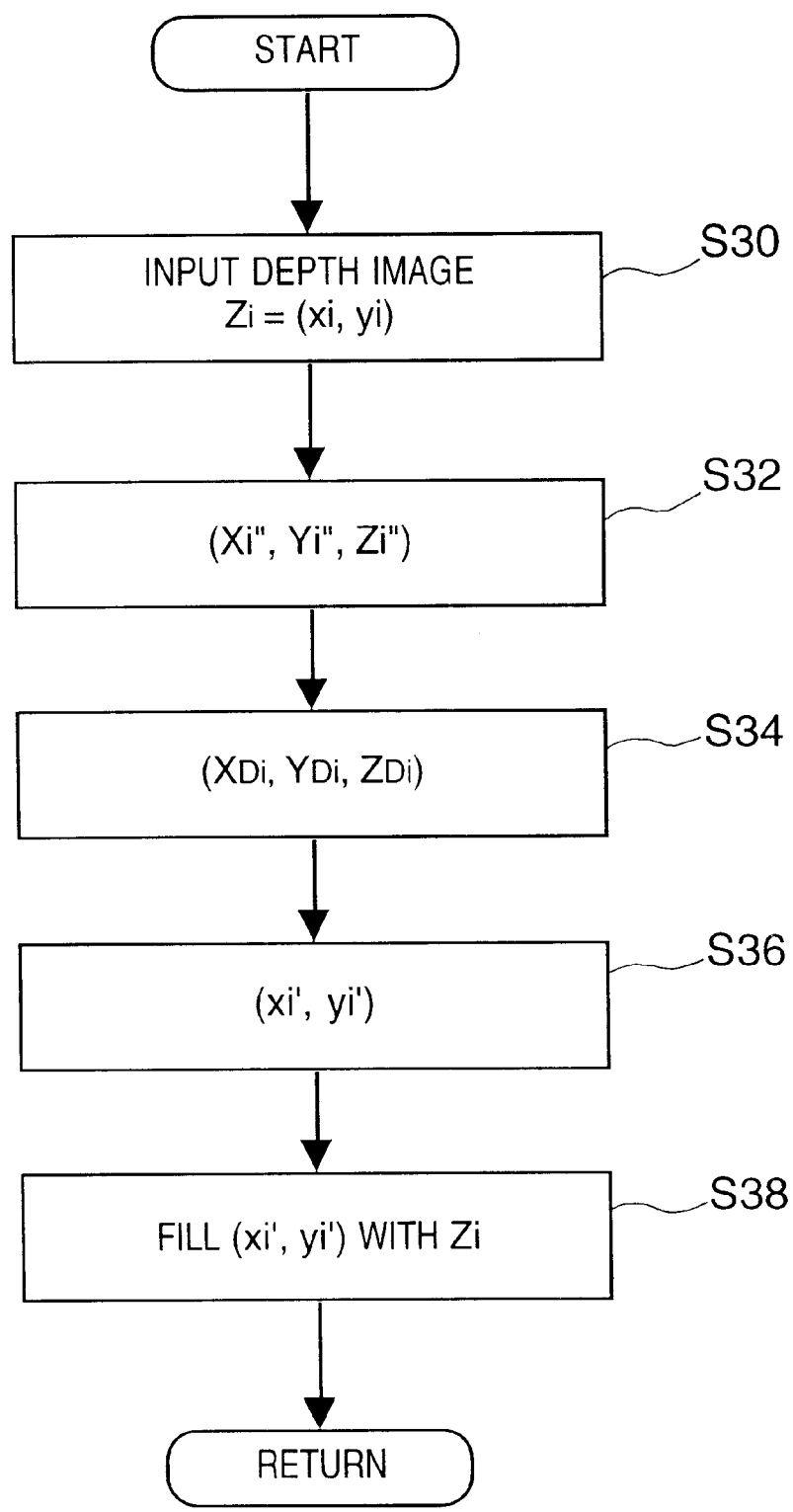
FIG. 14 is a flow chart for explaining the operation sequence of the depth warping module 203 of the first embodiment.

FIG. 14 explains the processing sequence of the depth warping module 203.

One point $(x_i, y_i)$ of the depth image ID is extracted in step S30, and is projected onto the camera coordinate system of the camera 102 at the viewpoint having position/posture value $V_{TO}$ according to equation (10) above in step S32. More specifically, the coordinate position $(X_i'', Y_i'', Z_i'')$ of the point $(x_i, y_i)$ on the camera coordinate system is calculated. In step S34, the coordinate position $(X_{Di}, Y_{Di}, Z_{Di})$ of the point $(X_i'', Y_i'', Z_i'')$, viewed from the camera coordinate system of the camera 102 at the viewpoint having position/posture value $V_{tF}$ is calculated using equation (11) above. Subsequently, in step S36, the position $(x_i', y_i')$ of the warped depth image is calculated using equation (12) above. In step S38, pixels $(x_i', y_i')$ on this output image are filled with $Z_{Di}$. Such processes repeat themselves for all the pixels, thus warping the depth image.

Since one point on the non-warped depth image ID has a one-to-one correspondence with that on the warped depth image $ID_W$, the warped depth image $ID_W$ may have "holes". Such image having "holes" can be corrected by compensating the values of missing pixels by linear interpolation using surrounding pixels. Also, such image having "holes" can be corrected using a scheme described in Shenchang Eric Chen & Lance Williams, "View Interpolation for Image Synthesis", Computer Graphics Annual Conference Series (Proceedings of SIGGRAPH 93), pages 279–288, Anaheim, Calif., August 1993.

<Operation Timing of First Embodiment>

Figure 15:
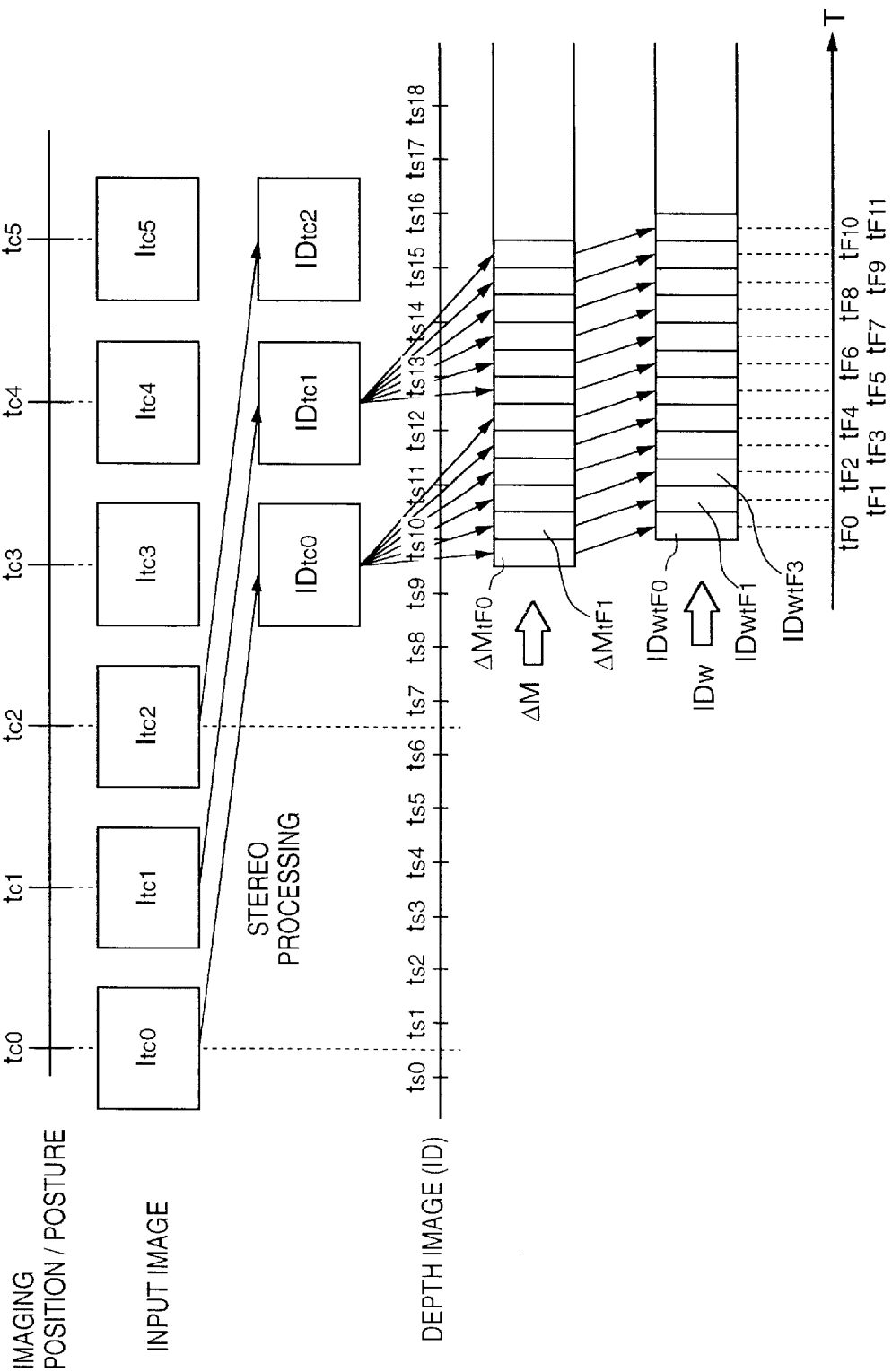
FIG. 15 is a timing chart for explaining an example of the operation of the first embodiment.

FIG. 15 shows the operation timing of the image processing apparatus of the first embodiment.

The frame rates of the depth estimation module and depth warping module can be independently set. As shown in FIG. 15, when the frame rate of the depth warping module is set to be higher than that of the depth estimation module (in the example of FIG. 15, 6 times), a plurality of warped depth images $ID_W$ (six images in the example of FIG. 15) can be obtained from a single input image at high speed (6 times in the example of FIG. 15).

<Modification of First Embodiment>

In the first embodiment, an image obtained by the right camera 102R is to be processed. Alternatively, a depth image corresponding to an image sensed by the left camera 102L may be output by similar processing. Also, depth images for both the right and left cameras may be output.

<Second Embodiment>

In the second embodiment, the principle of the embodiment shown in FIG. 6 is applied to an optical see-through augmented reality presentation system.

Figure 16:
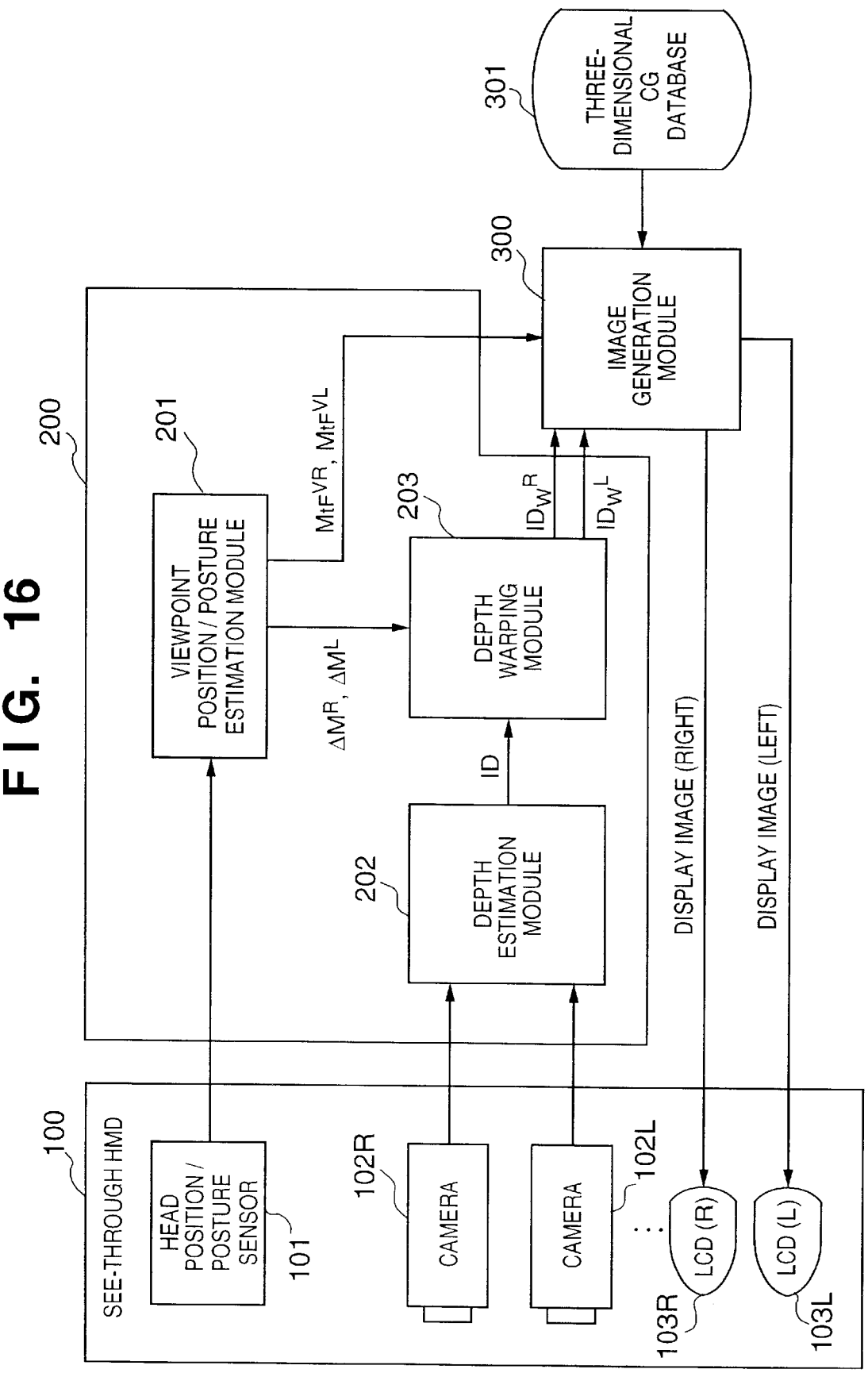
FIG. 16 is a block diagram for explaining the arrangement of an augmented reality presentation system to which an image processing apparatus according to the second embodiment of the present invention is applied.

FIG. 16 is a block diagram showing the system of the second embodiment, and the same reference numerals in FIG. 16 denote the same components as those in the embodiment shown in FIG. 6. Note that a component 100 represents an optical see-through HMD. The system of the second embodiment is constructed by the HMD 100, a depth image generation apparatus 200, an image generation module 300, and a three-dimensional CG database 301.

The HMD 100 comprises an LCD 103R for displaying a right-eye image, and an LCD 103L for displaying a left-eye image, since it is of optical see-through type. In order to accurately detect the viewpoint position, a three-dimensional position/posture sensor 101 is provided to the HMD 100.

The depth image generation apparatus 200 (FIG. 16) of the second embodiment has the following differences from the depth image generation apparatus 200 (FIG. 6) of the aforementioned embodiment. That is, first, the second embodiment requires a depth image at each viewpoint of the observer (not shown) in place of that at each viewpoint of the camera 102R. Second, depth images must be generated in correspondence with the right and left viewpoints of the observer. Furthermore, the output from a viewpoint position/posture estimation module 201 of the second embodiment is output to the image generation module 300 in addition to a depth warping module 203 unlike in the first embodiment. The position/posture estimation module 201 outputs viewpoint position/posture information of the observer upon presentation of an image to the image generation module 300.

The image generation module 300 uses the position/posture information input from the position/posture estimation module 201 as that for CG rendering. The module 300 generates an augmented reality image using the three-dimensional CG database in accordance with the distance to an object in the real world expressed by the depth image, and presents it on the LCDs 103.

Note that the three-dimensional CG database 301 stores, for example, CG data of the virtual object 410 shown in FIG. 1.

<Operation of Viewpoint Position/Posture Estimation Module 201> . . . Second Embodiment The operation of the position/posture estimation module 201 of the second embodiment will be explained below.

The position/posture estimation module 201 of the second embodiment outputs matrices $\Delta M^R$ and $\Delta M^L$ that represent three-dimensional motions from a viewpoint position/posture information $V_{tO}^{CR}$ of the camera 102R at time $t_0$ to right and left viewpoint positions $V_{tF}^{UR}$ and $V_{tF}^{UL}$ of the observer at time $t_F$ to the depth warping module 203. Assume that suffices C, U, R, and L respectively indicate the camera, user (observer), right, and left.

The position/posture estimation module 201 outputs the right and left viewpoint positions $V_{tF}^{UR}$ and $V_{tF}^{UL}$ at time $t_F$ to the image generation module 300. As shown in FIG. 16, the position/posture sensor 101 in the second embodiment outputs not only the viewpoint position/posture information $V_{ts}^{CR}$ of the camera 102R but also information of the right and left viewpoint positions/postures $V_{ts}^{UR}$ and $V_{ts}^{UL}$ unlike in the first embodiment.

The method of calculating position/posture $V_{t0}^{CR}$ of the camera 102R at time $t_0$ (and a corresponding viewing transformation matrix $M_{t0}^{CR}$) in the second embodiment is the same as that in the first embodiment.

On the other hand, the right and left viewpoint positions/positions $V_{tF}^{UR}$ and $V_{tF}^{UL}$ of the observer at time $t_F$ (=$t_0+\Delta t$) (and corresponding viewing transformation matrices $M_{tF}^{UR}$ and $M_{tF}^{UL}$) can be estimated by equation (8) as in the first embodiment. In this case, the viewpoint position/posture is not that of a camera but of the observer.

Matrices $\Delta M^R$ and $\Delta M^L$ that represent three-dimensional motions can be calculated as in equation (9) by:

$$\Delta M^R = M_{tF}^{UR} \cdot (M_{t0}^{CR})^{-1}$$

$$\Delta M^L = M_{tF}^{UL} \cdot (M_{t0}^{CL})^{-1} \qquad (13)$$

Since the processing of the depth estimation module 202 of the second embodiment is the same as that in the first embodiment, a detailed description thereof will be omitted.

Note that the position/posture sensor 101 may output $V_{ts}^{CR}$ alone. In this case, the position/posture estimation module 201 internally calculates $V_{ts}^{UR}$ and $V_{ts}^{UL}$ using the relative position relationship between the camera 102R, and the right and left viewpoint positions/postures of the observer as known information.

<Depth Warping Module 203> . . . Second Embodiment

Unlike the first embodiment, depth images required as warped depth images in the second embodiment are those in the real world observed from the viewpoint position/postures of the observer via the LCDs 103. That is, when a virtual camera equivalent to the viewpoint of the observer is assumed, and $f_U$ (U is the user (observer)) represents the focal length of that virtual camera, the operation of the depth warping module 203 of the second embodiment is to inversely project a depth image ID acquired at a viewpoint having position/posture information $V_{t0}$ into a space, and to re-project it onto the imaging plane of the virtual camera with the focal length $f_U$ assumed at the viewpoint having position/posture value $V_{tF}$. This operation is implemented by replacing the value of the focal length $f_c$ of the camera 102 by the focal length $f_U$ of the virtual camera in equation (12) that expresses projection to the depth image $ID_W$.

Furthermore, compared to the first embodiment, the depth warping module of the second embodiment has the following difference. More specifically, the depth warping module of the second embodiment receives the matrices $\Delta M^R$ and $\Delta M^L$ representing two three-dimensional motions corresponding to the right and left viewpoint positions/postures as the matrix $\Delta M$ that expresses the three-dimensional motion of the viewpoint position, and outputs two depth images $ID_W^R$ and $ID_W^L$ corresponding to the right and left viewpoint positions/postures as the depth image $ID_W$. These outputs can be obtained by independently warping images corresponding to the right and left viewpoints.

<Image Generation Module 300> . . . Second Embodiment

FIG. 16 shows the arrangement of the image generation module 300 of the second embodiment.

Generation of an image to be displayed on the LCD 103R, which is presented to the right eye of the observer, will be described first.

The CG renderer 302 renders a grayscale image (or color image) and depth image of CG data received from the three-dimensional database 301 on the basis of the viewpoint position/posture information $V_{tF}^{UR}$ of the right eye of the observer input from the position/posture estimation module 201. The generated grayscale image (or color image) is supplied to a mask processor 303, and the depth image is supplied to a depth ordering discrimination processor 304. The depth ordering discrimination processor 304 also receives the warped depth image $ID_W^R$ from the depth warping module 203. This depth image $ID_W^R$ represents depth information of the real space. Hence, the depth ordering discrimination processor 304 compares the depth of a CG image to be displayed and that of the real space in units of pixels, generates a mask image in which "0" is set in all pixels corresponding to real depths smaller than the CG depths, and "1" is set in other pixels, and outputs that image to the mask processor 303.

Zero pixel value of a given coordinate position on the mask image means that a CG figure rendered at the identical coordinate position on a CG image is located behind an object in the real space, and cannot be seen since it must be occluded by that object. The mask processor 303 mask-processes the CG image on the basis of the mask image. That is, if each coordinate position on the mask image has zero pixel value, the processor 303 sets the pixel value of an identical coordinate position on the CG image at "0". The output from the mask processor 303 is output to the display 103R. An image to be displayed on the LCD 103L which is presented onto the left eye of the observer is generated in similar processes.

To restate, according to the apparatus of the second embodiment, since mask processing is done on the basis of a depth image which is expected to be observed at time $t_F$ without being influenced by a delay produced by stereo processing upon generation of a CG image to be presented to the observer, augmented reality free from any conflict between the real space and CG image can be given.

It is also possible to generate the image to be displayed without the depth ordering discrimination processor 304 and the mask processor 303. In this case, the CG renderer 302 receives the warped depth image $ID_W^R$ from the depth warping module 203. At first, the CG renderer 302 renders a black object over the image which has the depth of the depth image $ID_W^R$. Then, the CG renderer 302 renders and overlays a virtual image by using ordinal depth-keying technique.

<Modification of Second Embodiment>

In the second embodiment, theoretically it is preferable that the depth image be corrected using the viewpoint position of the observer at the presentation timing of the augmented reality image to the observer as a target viewpoint position. Let $\delta_4$ be a processing time required from when the image generation module 300 inputs the depth image $ID_W$ until the augmented reality image is presented onto the LCDs 103. Theoretically, by setting a time duration $\Delta t$ required for the warp process in the depth image generation apparatus 200 to be:

$$\Delta t = \delta_1 + \delta_2 + \delta_3 + \delta_4 \qquad (14)$$

the augmented reality image per frame to be presented to the LCDs 103 is synchronized with the real space the observer is currently observing.

In the second embodiment, a position/posture and focal length of the camera 102, and the right and left viewpoint positions/postures and focal length of the observer are independently processed. However, if the viewpoint of the observer matches the camera, they can be processed as identical ones.

In the second embodiment, different videos are presented on the right and left eyes of the observer. However, in case of an optical see-through augmented reality presentation system having a single-eye optical system, processing corresponding to only one eye of the observer need be done.

<Third Embodiment>

Figure 18:
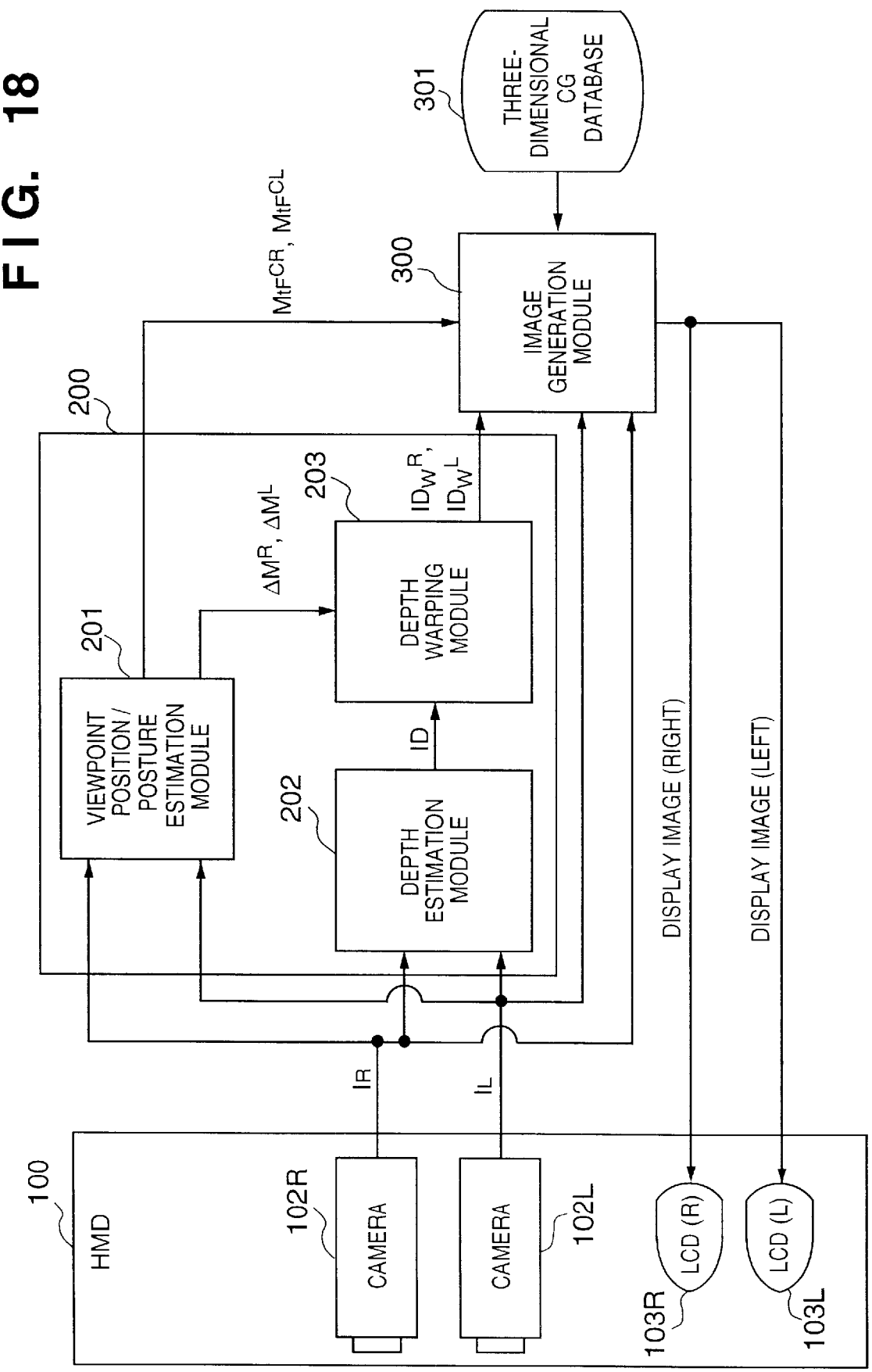
FIG. 18 is a block diagram for explaining the arrangement of an augmented reality presentation system to which an image processing apparatus according to the third embodiment of the present invention is applied.

In the third embodiment, the principle of the embodiment shown in FIG. 6 is applied to a video see-through augmented reality presentation system, and FIG. 18 shows the arrangement of that system.

Upon comparing the constructing elements of the system of the third embodiment in FIG. 18 with those of the system of the second embodiment shown in FIG. 16, the former system is different from the latter one in that the former system has no head mounted position/posture sensor 101, and a viewpoint position/posture estimation module 201 can estimate movement of the viewpoint from an image acquired by one camera 102.

Since the third embodiment uses a video see-through HMD, the arrangement of an image generation module is also different from the second embodiment, as will be described later.

Also, since the video see-through scheme is used, some of images to be displayed on LCDs 103 are obtained from cameras 102 in the third embodiment.

<Viewpoint Position/Posture Estimation Module 201> . . . Third Embodiment

The position/posture estimation module 201 of the third embodiment outputs matrices $\Delta M^R$ and $\Delta M^L$ that represent three-dimensional motions from a viewpoint of a camera 102R having position/posture $V_{t0}^{CR}$ at time $t_0$ to right and left viewpoints of right and left cameras 102R and 102L having positions/postures $V_{tF}^{CR}$ and $V_{tF}^{CL}$ at time $t_F$, to a depth warping module 203. Furthermore, the module 201 outputs the viewpoint positions/postures $V_{tF}^{CR}$ and $V_{tF}^{CL}$ of the right and left cameras 102R and 102L at time $t_F$ to an image generation module 300.

The position/posture estimation module 201 in the first and second embodiments detects viewpoint positions/postures on the basis of the output from the position/posture sensor 101. However, the position/posture estimation module 201 of the third embodiment estimates movement of the viewpoint on the basis of images input from the cameras 102R and 102L.

Various schemes for estimating viewpoint position/posture on the basis of image information are available. For example, by tracking changes in coordinate value of feature points, the position on the real space of which is known, in an image, movement of the viewpoint position can be estimated. For example, in FIG. 19, assume that an object 600 present in the real space has vertices $Q_1$, $Q_2$, and $Q_3$ as feature points. The coordinate values of these vertices $Q_1$, $Q_2$, and $Q_3$ on the real space are known. A viewpoint represented by $V_{t1}$ can be calculated from the coordinate values of the vertices $Q_1$, $Q_2$, and $Q_3$ at time $t_1$ and the known coordinate values of these vertices on the real space. Even when an image shown in FIG. 19 is obtained at time $t_2$ as a result of movement of the camera, a viewpoint position/posture information $V_{t2}$ can be similarly calculated.

The number of known feature points used in the above scheme must be changed depending on the algorithms used. For example, an algorithm described in U. Neumann & Y. Cho, "A self-tracking augmented reality system", Proceedings VRST '96, pages 109–115, 1996 requires three feature points, or an algorithm described in Nakazawa, Nakano, Komatsu, & Saito, "Moving Image Synthesis System of Actually Taken Image and CG image Based on Feature Points in Image", the Journal of Society of Video Information Media, Vol. 51, No. 7, pages 1086–1095, 1997 requires four feature points. Also, a scheme for estimating a viewpoint position from two videos sensed by the right and left cameras 102 (e.g., A. State et al., "Superior augmented reality registration by integrating landmark tracking and magnetic tracking", Proceedings SIGGRAPH '96, pages 429–438, 1996) may be used.

In this way, after the position/posture estimation module 201 of the third embodiment has acquired position/posture information $V_{tC0}$, . . . , $V_{tCm}$ of viewpoints of the camera 102R at times $t_{C0}$, . . . , $t_{Cm}$, it outputs matrices $\Delta M$ ($\Delta M^R$ and $\Delta M^L$) that describe three-dimensional movements of the cameras and the viewpoint positions/postures $M_{tF}$ ($M_{tF}^{CR}$ and $M_{tF}^{CL}$) of the cameras 102 to the depth warping module 203 and image generation module 300, respectively.

Note that the processing of the depth estimation module 202 of the third embodiment is the same as that in the first embodiment, and a detailed description thereof will be omitted.

<Depth Warping Module 203> . . . Third Embodiment

The depth warping module in the third embodiment receives the matrices $\Delta M^R$ and $\Delta M^L$ representing two three-dimensional motions corresponding to the positions/postures of right and left viewpoints as the matrix $\Delta M$ expressing a three-dimensional motion of viewpoint, and then outputs two depth images $ID_W^R$ and $ID_W^L$ corresponding to the positions/postures of right and left viewpoints as the depth image $ID_W$, as in the second embodiment. However, since the viewpoint positions/postures are those of the cameras 102, the value of the focal length $f_C$ of each camera 102 can be used as the focal length in equation (12) that expresses projection onto the depth image $ID_W$.

<Image Generation Module 300> . . . Third Embodiment

Figure 17:
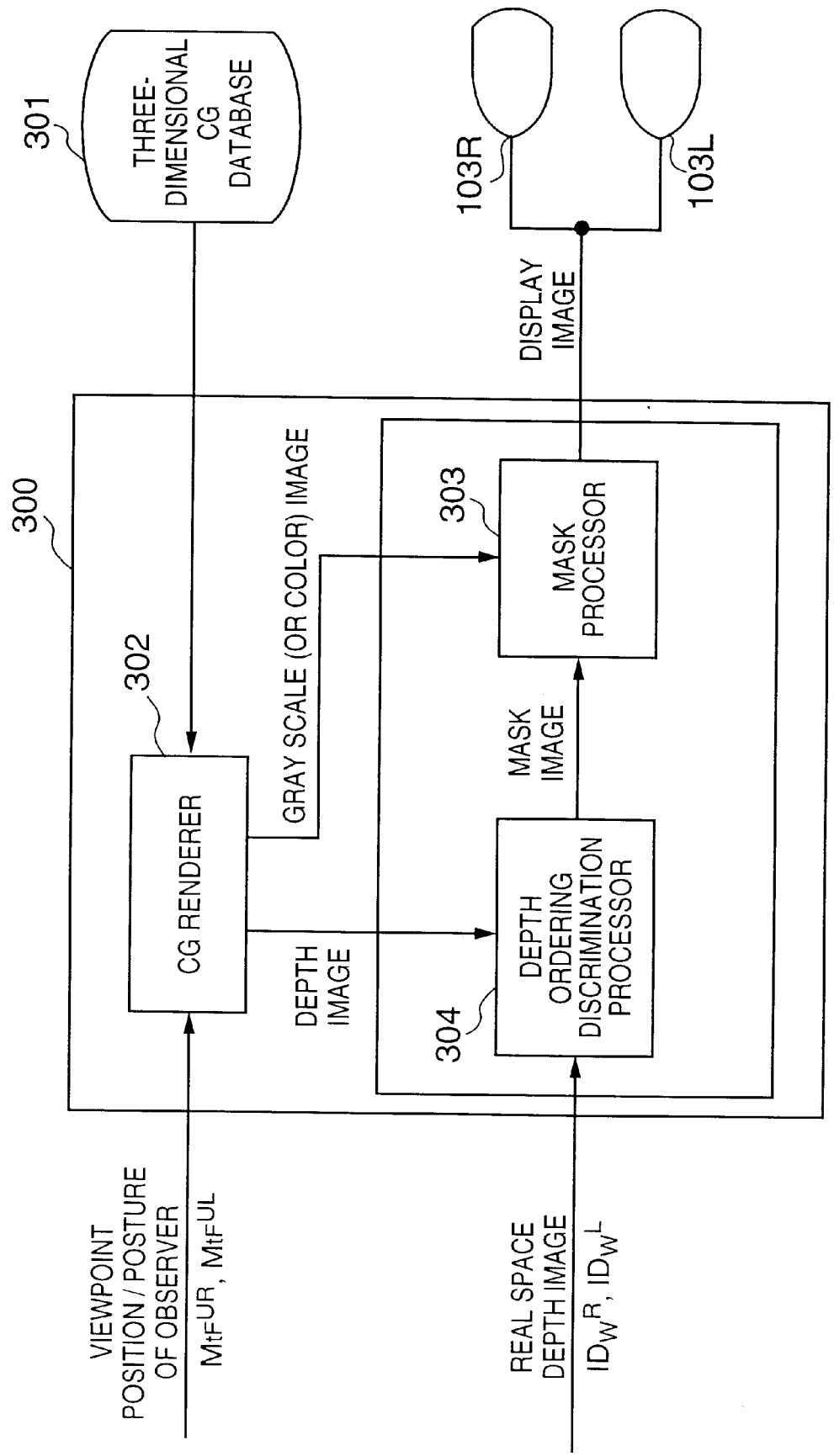
FIG. 17 is a block diagram showing the arrangement of an image generation module 300 in the image processing apparatus of the second embodiment.
Figure 20:
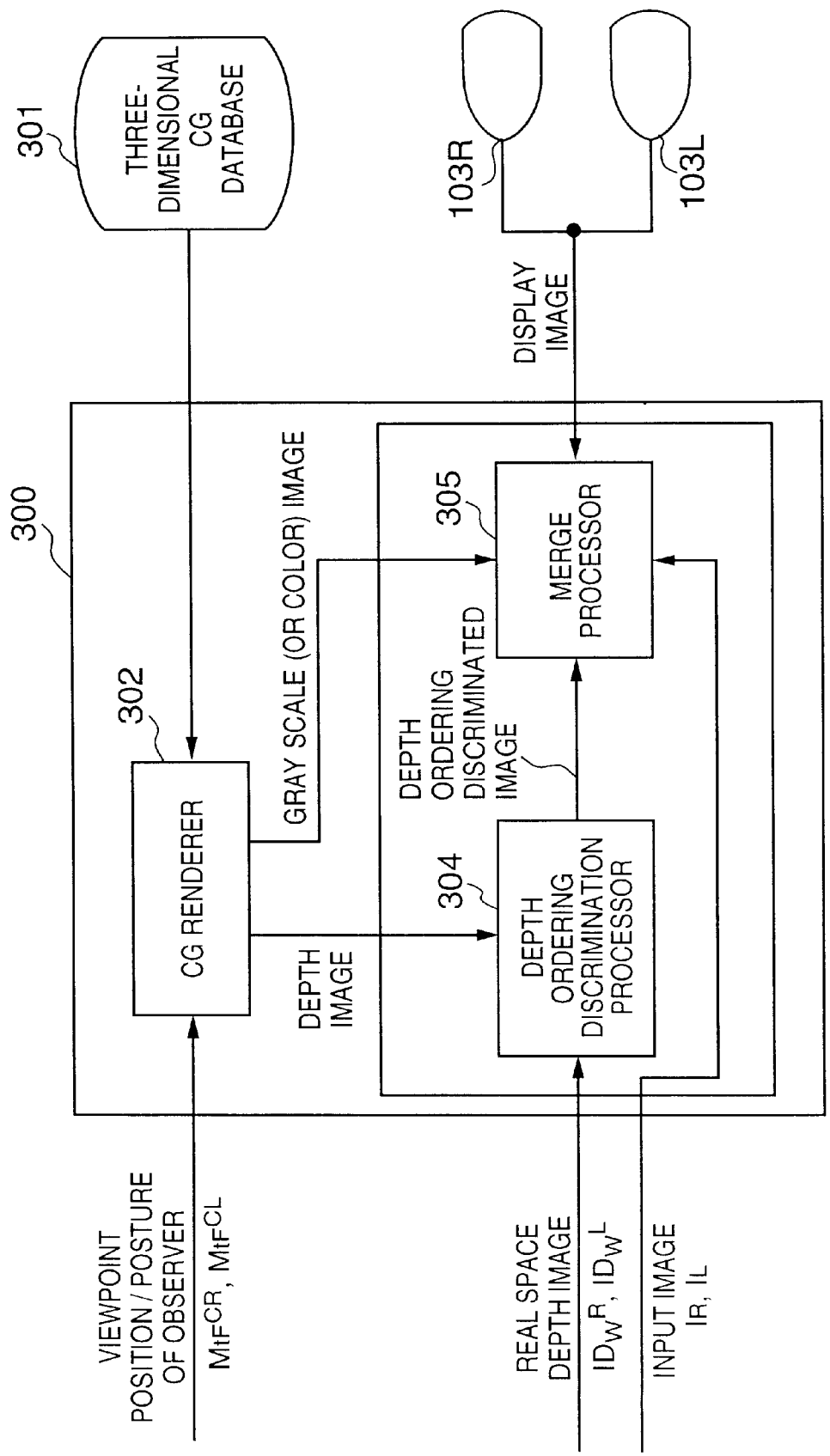
FIG. 20 is a block diagram showing the arrangement of an image generation module 300 in the image processing apparatus of the third embodiment.

FIG. 20 shows the arrangement of the image generation module 300 of the third embodiment. Upon comparison with the image generation module 300 (FIG. 17) of the second embodiment, a CG renderer 302 and depth ordering discrimination processor 304 of the third embodiment are substantially the same as those in the second embodiment. On the other hand, a merge processor 305 merges and outputs real images and images from the CG renderer 302 unlike in the second embodiment.

The CG renderer 302 of the third embodiment renders a grayscale image (or color image) and depth image of CG data received from a three-dimensional database 301 on the basis of the viewpoint position/posture information $V_{tF}^{CR}$ of the camera 102R input from the position/posture estimation module 201. The generated grayscale image (or color image) is sent to the merge processor 305 and the depth image is sent to the depth ordering discrimination processor 304.

It is also possible to generate the image to be displayed without the depth ordering discrimination processor 304 and the merge processor 305. In this case, the CG renderer 302 receives the warped depth image $ID_W^R$ from the depth warping module 203 and real grayscale image (or color image) from the camera. At first, the CG renderer 302 renders a real grayscale image (or color image) which has the depth of the depth image $ID_W^R$. Then, the CG renderer 302 renders and overlays a virtual image by using ordinal depth-keying technique.

Since the processing of the depth ordering discrimination processor 304 is the same as that in the second embodiment, a detailed description thereof will be omitted. However, in the third embodiment, the image output from the depth ordering discrimination processor 304 is referred to not as a mask image but as a depth ordering discriminated image.

The merge processor 305 merges the CG image (grayscale or color image) input from the renderer 302 and a real grayscale images (or color image) from the camera on the basis of the depth ordering discriminated image. That is, if each coordinate position on the depth ordering discriminated image has a pixel value "1", the processor 305 sets the pixel value at the identical coordinate position on the CG image to be that at the identical coordinate position on an output image; if the pixel value is zero, the processor 305 sets the pixel value at the identical coordinate position on the real image to be that at the identical coordinate position on the output image. The output from the merge processor 305 is supplied to the displays 103.

In the third embodiment, theoretically it is preferable that the viewpoint position of the camera at the input timing of a real image to be merged be set as the viewpoint position/posture information $V_{tF}$.

As described above, according to the apparatus of the third embodiment, since merging is done based on a depth image that is synchronized with the input time of the real space image to be merged without being influenced by a delay produced by stereo processing, augmented reality free from any conflict between the real image space and CG image can be given, as in the second embodiment.

Since the third embodiment estimates the viewpoint position on the basis of an image from the camera, it is suitable for a video see-through augmented reality presentation system.

Figure 21:
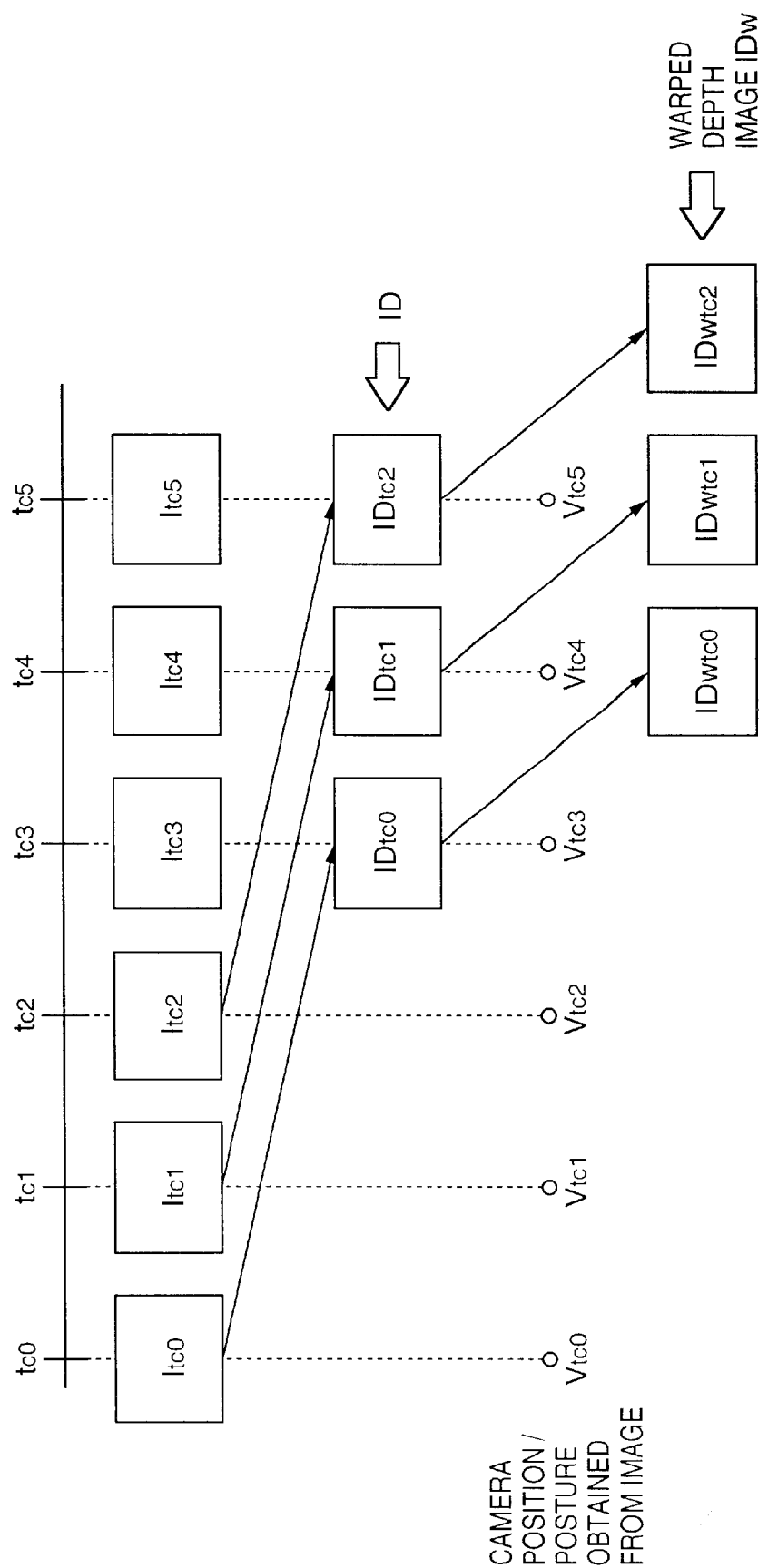
FIG. 21 is a timing chart for explaining the operation of the third embodiment.

FIG. 21 explains the operation timing of the third embodiment.

<Modification 1>

The second and third embodiments have explained application to depth ordering discrimination between the real world and virtual image in the augmented reality presentation system. However, a depth image measurement apparatus of the present invention can also be applied to collision discrimination between the real world and virtual image in the augmented reality presentation system.

Furthermore, the depth image measurement apparatus of the present invention can also be used in applications such as an environment input apparatus for a moving robot and the like, which must acquire depth information of the real environment in real time without any delay.

<Modification 2>

The position/posture estimation module 201 in the third embodiment can also estimate the viewpoint position/posture at time $t_F$ by two-dimensional displacements of feature points on an image.

Figure 22:
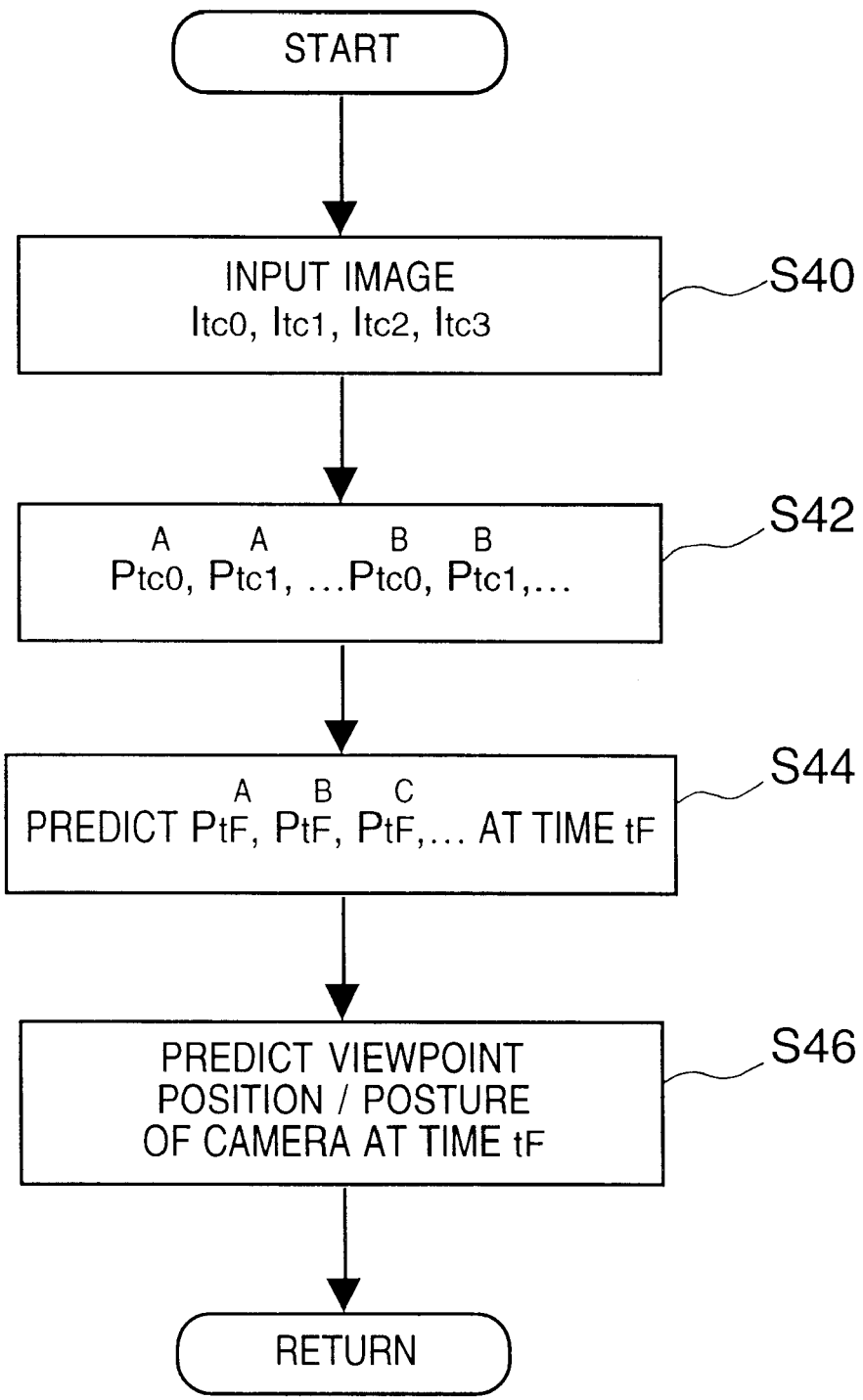
FIG. 22 is a flow chart showing the control sequence of viewpoint position/posture estimation according to the other method.

FIG. 22 shows the control sequence of the position/posture estimation module 201 upon two-dimensionally extracting feature points.

In step S40, images are input from the camera 102 in turn. Assume that the camera 102 has sensed images $I_{tC0}$, $I_{tC1}$, $I_{tC2}$, ... at times $t_{C0}$, $t_{C1}$, $t_{C2}$, ... From these input images, a sequence of coordinate values $P^A_{tC0}$, $P^A_{tC1}$, $P^A_{tC2}$, ... of feature point A are obtained in step S42. In step S44, a coordinate value $p^A_{tF}$ of feature point A at time $t_F$ is estimated. For example, this estimation may be implemented by 1st-order (linear) prediction. More specifically, assuming that the coordinate values $P^A_{tCm}$ of feature points A on the image until time $t_{Cm}$ has been input at the current time, if:

$$t_F = t_{Cm} + \alpha \cdot (t_{Cm} - t_{Cm-1}) \quad (15)$$

then $P^A_{tF} = (X^A_{tF}, Y^A_{tF})$ satisfies:

$$x^A_{tF} = (1+\alpha) \cdot x^A_{tCm} - \alpha \cdot x^A_{tCm-1}$$

$$y^A_{tF} = (1+\alpha) \cdot y^A_{tCm} - \alpha \cdot y^A_{tCm-1} \quad (16)$$

The aforementioned processing is done for feature points B, C, ..., and in step S46 the position/posture information $V_{tF}$ at time $t_F$ is estimated using the coordinate values $P^A_{tF}$, $P^B_{tF}$, $P^C_{tF}$, ... obtained in step S44.

<Modification 3>

The viewpoint position/posture estimation module in the first or second embodiment uses information from the three-dimensional position/posture sensor, and that in the third embodiment uses image information from the cameras. However, these embodiments can be practiced using either scheme. Further, both three-dimensional position/posture sensor and camera may be used together in a modification. In this connection, a method disclosed in Japanese patent application Hei 10-65824 may be applied to the modification. The application is incorporated herewith by reference.

<Modification 4>

When a viewpoint position/posture is estimated based on image features in the estimation module of the embodiments or first embodiment, even if the position of a feature point on the real space is unknown, a three-dimensional motion $\Delta M$ of the viewpoint position/posture required for warping a depth image can be obtained.

Figure 23:
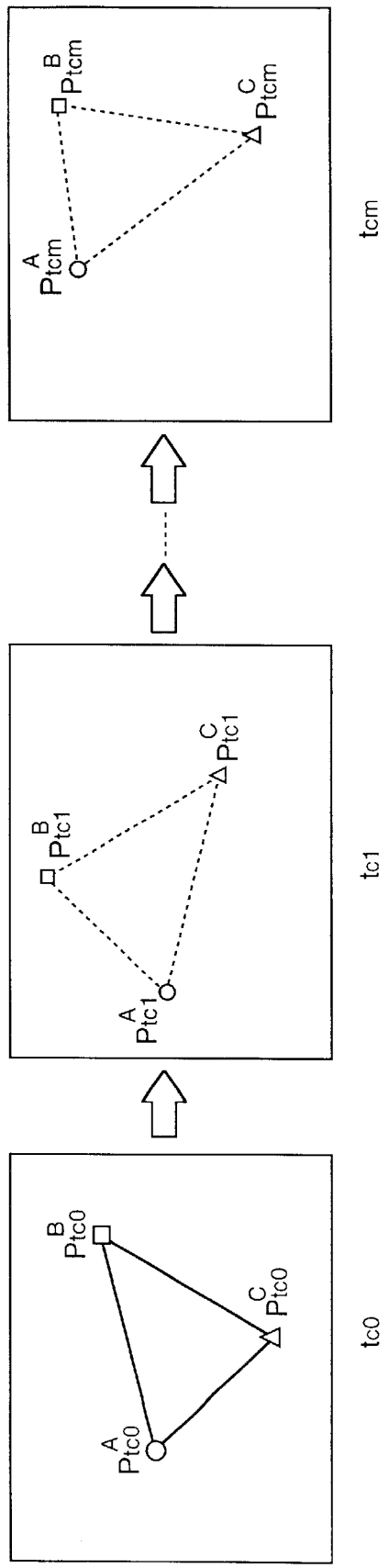
FIG. 23 is an illustration showing the control sequence of viewpoint position/posture estimation according to still another method.

For example, assume that a plurality of images $I_{iC0}$, $I_{iC1}$, ..., $I_{iCm}$ have been sensed at times $t_{C0}$ (=$t_0$) $t_{C1}$, ..., $t_{Cm}$, as shown in FIG. 23. At this time, the image coordinate values ($P^A_{tC0}$, $P^A_{tC1}$, ..., $P^A_{tCm}$; $P^B_{tC0}$, $P^B_{tC1}$, ..., $P^B_{tCm}$; $P^C_{tC0}$, $P^C_{tC1}$, ..., $P^C_{tCm}$) of a plurality of feature points (three points in FIG. 23) are tracked from the individual images, and the image coordinate values ($P^A_{tF}$, $P^B_{tF}$, and $P^C_{tF}$) of the respective feature points at time $t_F$ are estimated by the same scheme as in equation (13).

Based on a set of image coordinate values of these feature points, a relative change $\Delta M$ in viewpoint from time $t_0$ to time $t_F$ can be directly estimated. More specifically, for example, factorization (Takeo Kaneide et al., "Recovery of Object Shape and Camera Motion Based on Factorization Method", Journal of Institute of Electronics, Information and Communication Engineers D-II, No. 8, pages 1497–1505, 1993), Sequential Factorization (Toshihiko Morita et al., "A Sequential Factorization Method for Recovering Shape and Motion From Image Streams", IEEE Trans. PAMI, Vol. 19, No. 8, pages 858–867, 1998), and the like may be used.

In this case, there is no need for any knowledge about an environment, and feature points may be unknown ones as long as they can be identified among images by image processing.

<Modification 5>

In the basic embodiment or the embodiments, the depth estimation module may output depth images $ID^{C1}$, $ID^{C2}$, ... corresponding to images sensed by a plurality of cameras.

In this case, the viewpoint position/posture estimation module outputs matrices $\Delta M^{C1}$, $\Delta M^{C2}$, ... that represent three-dimensional motions from the viewpoints having values $V_{t0}^{C1}$, $V_{t0}^{C2}$, ... where the respective depth images were sensed to the viewpoint having position/posture value $V_{tF}$, and the depth warping module can obtain the warped depth image $ID_W$ using such information.

More specifically, the depth warping module warps the input depth images to generate warped depth images $ID_W^{C1}$, $ID_W^{C2}$, ... and combines these images, thus generating a warped depth image $ID_W$ as an output. Alternatively, the depth image $ID_W$ may be generated based on a depth image $ID^{Cn}$ acquired at a viewpoint (e.g., $V_{t0}^{Cn}$) with smallest three-dimensional motion, and only pixels of "holes" generated at that time may be filled using information of other depth images.

<Modification 6>

When a plurality of warped depth images must be generated like in the second and third embodiments, the viewpoint position/posture estimation module may output only a matrix ΔM that represents a three-dimensional motion of a typical viewpoint position (of, e.g., the right camera 102R). In this case, the depth warping module internally calculates the matrix ΔM that represents each three-dimensional motion on the basis of the relative positional relationship among the viewpoint positions.

<Modification 7>

In the above basic embodiment or embodiments, an image to be output by the depth image generation apparatus need not always indicate the depth value itself of the real space. More specifically, for example, a disparity image that holds disparity information having a one-to-one correspondence with depth information may be output. Computations in such case can be easily implemented on the basis of the correspondence between depth information and disparity information, which is normally used in a stereo image measurement.

<Modification 8>

In the above embodiments, warping of depth images by the depth warping modules are performed in a three-dimensional fashion on the basis of the matrices _M representing three-dimensional motions and depth values of pixels. The warping according to the above method can be made in more simplified manner.

For example, warped depth images $ID_W$ can be obtained by subjecting depth images ID to translation of two dimensional axis of image plane. This process is realized by selecting representative points of objects of interest in the depth image (objects which can be used for discriminating depth ordering with respect to imaginary objects), calculating image coordinate of the points which are subjected to viewpoint translation, and subjecting the entire depth image ID to similar translation of axis.

Warped depth image $ID_W$ can be obtained by assuming that the real space is a plane having depths of representative points, and subjecting the image ID to three-dimensional rotation and translation of axis. Also, the image ID may be divided into a plurality of layers having a representative depth, and warped depth image $ID_W$ can be obtained by subjecting each layer to three-dimensional transform.

Simplifying three-dimensional shape of the objects makes calculations easier, thus providing a quicker performance of processing. However, this results in approximated depth image. Where movements of viewpoint is very small, a shape of real world is not complex, or an application does not require high precision of depth image, these approximation above described are useful.

To recapitulate, according to the depth image measurement apparatus and method of the present invention, depth images of the real world can be acquired in real time without any delay.

Also, according to the image processing apparatus and method, and the augmented reality presentation system and method of the present invention, even when the viewpoint of the observer changes, a three-dimensionally matched augmented reality image can be presented.

Furthermore, according to the image processing apparatus and method, and the augmented reality presentation system and method of the present invention, three-dimensionally matched augmented reality images can be especially continuously presented.

As many apparently widely different embodiments of the present invention can be made without departing from the spirit and scope thereof, it is to be understood that the invention is not limited to the specific embodiments thereof except as defined in the appended claims.

What is claimed is:

1. A depth image measurement apparatus for acquiring depth information of a scene, comprising:

image input means for inputting an image of the scene at a first viewpoint;

depth image generation means for generating a first depth image from the scene image inputted at the first viewpoint by said image input means;

position/posture estimation means for estimating, based on information relating to displacement of the first viewpoint, a position and posture information at a second viewpoint viewed from a position and posture of the first viewpoint; and warping means for warping the first depth image generated by said depth image generation means to a second depth image at the second viewpoint on the basis of the position and posture information at the second viewpoint estimated by said position/posture estimation means.

2. A depth image measurement apparatus for continuously acquiring depth information of a scene, comprising:

image input means for inputting a sequence of images of the scene at a first sequence of viewpoints;

depth image generation means for generating a first sequence of depth images from the scene images sequentially input at said first sequence of viewpoints by said image input means;

position/posture estimation means for estimating, based on information relating to displacement of the first viewpoint, a sequence of viewpoint position/posture information of a second sequence of viewpoints viewed from the first sequence of viewpoints; and warping means for sequentially warping the first sequence of depth images generated by said depth image generation means to a second sequence of depth images at the second sequence of viewpoints on the basis of the viewpoint position/posture information of the second sequence of viewpoints estimated by said position/posture estimation means.

3. The apparatus according to claim 2, wherein each one of the second sequence of viewpoints is a viewpoint where said image input means has reached at a second time after an elapse of a time from a first time at which said input means input a scene image at a respective viewpoint of the first sequence of viewpoints.

4. The apparatus according to claim 3, wherein the second time is a time at which said depth image measurement apparatus outputs the second depth image.

5. The apparatus according to claim 3, wherein the second time is a time at which an apparatus connected to said depth image measurement apparatus finally uses a result of processing that uses the second depth image.

6. The apparatus according to claim 3, wherein the second time is a time at which said warping means receives the first depth image.

7. The apparatus according to claim 4, wherein a time duration between the first and second times is known in advance.

8. The apparatus according to claim 3, wherein the second time can be freely set at a time after the first time.

9. The apparatus according to claim 2, wherein each one of the second sequence of viewpoints is a viewpoint obtained by adding an offset to a respective viewpoint of said image input means, said offset relating to a position and posture of a three-dimensional sensor for sensing observer's viewpoint.

10. The apparatus according to claim 3, wherein each one of the second sequence of viewpoints is a viewpoint obtained by adding an offset to a viewpoint position and posture of said image input means at the second time, said offset relating to a position and posture of a three-dimensional sensor for sensing observer's viewpoint.

11. The apparatus according to claim 9, further comprising a plurality of sensors for sensing observer's viewpoint, wherein an offset is set to each one of the sensors.

12. The apparatus according to claim 9, wherein an amount of the offset is known in advance.

13. The apparatus according to claim 1, wherein the first viewpoint occurs at a plurality of viewpoints, said depth image generation means generates a first depth image in correspondence with each respective first viewpoint, said position/posture estimation means estimates viewpoint position/posture information of the second viewpoint viewed from each first viewpoint, and said warping means warps each of the first depth image on the basis of each viewpoint position/posture information, and outputs the second depth image.

14. The apparatus according to claim 2, wherein said image input means inputs images from a plurality of video cameras.

15. The apparatus according to claim 14, wherein said depth image generation means generates the first depth image by performing stereo image processing for the images input by said image input means.

16. The apparatus according to claim 2, wherein said depth image generation means generates the first depth image using an active range finder.

17. The apparatus according to claim 2, wherein said position/posture estimation means estimates the sequence of viewpoint position/posture information on the basis of the image input by said image input means.

18. The apparatus according to claim 2, wherein said position/posture estimation means extracts image coordinate positions of feature points from the images sequentially input by said image input means, and estimates the sequence of viewpoint position/posture information using the image coordinate of the feature points.

19. The apparatus according to claim 18, wherein said position/posture estimation means includes:

recovery means for recovering a time-sequential locus of a viewpoint on the basis of the images sequentially input by said image input means, and said position/posture estimation means estimates the sequence of viewpoint position/posture information on the basis of the locus.

20. The apparatus according to claim 19, wherein said recovery means recovers the locus of the viewpoint on the basis of time-sequential information of images input by said image input means.

21. The apparatus according to claim 19, wherein said recovery means recovers the locus of the viewpoint on the basis of information of each image input by said image input means.

22. The apparatus according to claim 18, wherein said position/posture estimation means estimates the image coordinate positions of the feature points at the second viewpoint position on the basis of images sequentially input by said image input means, and estimates the sequence of viewpoint position/posture information on the basis of the estimated image coordinate positions.

23. The apparatus according to claim 17, wherein said position/posture estimation means estimates a viewpoint position of said image input means on the basis of the image, and outputs a viewpoint position/posture information obtained by adding an offset to the viewpoint position and posture of said image input means.

24. The apparatus according to claim 2, wherein said position/posture estimation means receives a position/posture information from a three-dimensional position/posture sensor attached to said image input means, and estimates the viewpoint position/posture information on the basis of a signal from said three-dimensional position/posture sensor.

25. The apparatus according to claim 24, wherein said position/posture estimation means recovers a time-sequential locus of a viewpoint on the basis of the signals sequentially inputted from said three-dimensional position/posture sensor, and estimates viewpoint on the basis of the locus.

26. The apparatus according to claim 24, wherein said position/posture estimation means estimates a position and posture of a viewpoint of said three-dimensional position/posture sensor itself on the basis of an output from said three-dimensional position/posture sensor, and outputs a viewpoint information obtained by adding an offset to the position and posture of the viewpoint of said three-dimensional position/posture sensor.

27. The apparatus according to claim 19, wherein said position/posture estimation means specifies a function having a shape similar to a locus of the viewpoint, and outputs as the viewpoint position/posture information a value of the function at the second time.

28. The apparatus according to claim 17, wherein said position/posture estimation means outputs as the viewpoint position/posture information a coordinate transformation matrix from each first viewpoint to a respective second viewpoint.

29. The apparatus according to claim 2, wherein said warping means includes calculation means for calculating a coordinate value and depth value of a point on the second depth image, which corresponds to a point on the first depth image, by three-dimensional coordinate transformation on the basis of the viewpoint position/posture information.

30. The apparatus according to claim 29, wherein said warping means further includes compensation means for compensating a depth value of each point on the second depth image, which cannot be calculated by said calculation means.

31. An augmented reality presentation system comprising:

a depth image measurement apparatus for continuously acquiring depth information of a scene, comprising:

image input means for inputting a sequence of images of the scene at a first sequence of viewpoints;

depth image generation means for generating a first sequence of depth images from the scene images sequentially input at said first sequence of viewpoints by said image input means;

position/posture estimation means for estimating, based on information relating to displacement of the first sequence of viewpoints, a sequence of viewpoint position/posture information of a second sequence of viewpoints viewed from the first sequence of viewpoints; and warping means for sequentially warping the first sequence of depth images generated by said depth image generation means to a second sequence of depth images at the second sequence of viewpoints on the basis of the viewpoint position/posture information of the second sequence of viewpoints estimated by said position/posture estimation means; and a head mount display comprising a plurality of video cameras for inputting images in front of an observer, and a display for displaying a three-dimensional grayscale image or color image, wherein a three-dimensional grayscale or color image generated according to the second depth image is presented to the observer.

32. The system according to claim 31, further comprising:
an optical see-through HMD;
rendering means for rendering a computer graphics figure; and
masking means for masking the computer graphics figure on the basis of the second depth image, and
wherein the computer graphics figure masked by said masking means is output to said display.

33. The system according to claim 31, further comprising:
a video see-through HMD;
rendering means for rendering a computer graphics figure; and
merging means for merging the computer graphics figure to an image input by said image input means on the basis of the second depth image, and
wherein the computer graphics figure merged by said merging means is output to said display.

34. The system according to claim 32, wherein said rendering means generates a grayscale image or color image and a depth image of the computer graphics figure, and
said masking means masks the computer graphics figure on the basis of depth ordering of the depth image of the computer graphics figure and the second depth image in units of pixels.

35. The system according to claim 33, wherein said rendering means generates a grayscale image or color image and a depth image of the computer graphics figure, and
said merging means executes occlusion processing between the computer graphics figure and an image input by said image input means on the basis of depth ordering of the depth image of the computer graphics figure and the second depth image in units of pixels.

36. The system according to claim 32, wherein the second sequence of viewpoints are a viewpoint of an observer, and
an offset is an offset from a viewpoint of one of said video cameras to a viewpoint of the observer.

37. The system according to claim 36, wherein the viewpoint of the observer includes right and left viewpoints of the observer.

38. The system according to claim 36, wherein the second time is a time at which the graphics figure is displayed on said display.

39. The system according to claim 33, wherein the second sequence of viewpoints include a viewpoint position of the video cameras corresponding to right and left viewpoints of the observer at the second time.

40. The system according to claim 39, wherein the second time is a time at which the image to be merged with the graphics figure was sensed.

41. A depth image measurement method for continuously acquiring depth information of a scene, comprising:

the image input step of inputting a sequence of images of the scene from a first sequence of viewpoints;

the depth image generation step of generating a first sequence of depth images from the scene images inputted in the image input step;

the position/posture estimation step of estimating, based on information relating to displacement of the first sequence of viewpoints, a sequence of viewpoint position/posture information for a second sequence of viewpoints viewed from the first sequence of viewpoints; and the warping step of continuously warping the first sequence of depth images generated in the depth image generation step to a second sequence of depth images at the second sequence of viewpoints on the basis of the viewpoint position/posture information of the second sequence of viewpoints estimated in the position/posture estimation step.

42. An augmented reality presentation method comprising:

the image input step of inputting a sequence of images of a scene from a first sequence of viewpoints, using a stereo camera for outputting a stereo image in front of an observer;

the depth image generation step of generating a first sequence of depth images from the scene images continuously input in the image input step;

the position/posture estimation step of estimating, based on information relating to displacement of the first sequence of viewpoints, a sequence of viewpoint position/posture information at a second sequence of viewpoints, when viewed from the first sequence of viewpoints;

the warping step of warping the first sequence of depth images continuously generated in the depth image generation step to a second sequence of depth images at the second sequence of viewpoints on the basis of the sequence of viewpoint position/posture information of the second sequence of viewpoints estimated in the position/posture estimation step;

the step of discriminating depth ordering of a virtual three-dimensional grayscale image and a real world on the-basis of the second depth image; and the step of displaying the virtual three-dimensional grayscale image onto a head mount display to merge the grayscale image with the real world.

43. A storage medium that stores an image processing program, which is implemented on a computer and continuously presents three-dimensional images to an observer, storing:

an image input program code of inputting a sequence of images from a first sequence of viewpoints;

a depth image generation program code of generating a first sequence of depth images from the continuously input images;

a position/posture information estimation program code of estimating, based on information relating to displacement of the first sequence of viewpoints, a sequence of viewpoint position/posture information of a second sequence of viewpoints, when viewed from the first sequence of viewpoints;

a warping program code of continuously warping the continuously generated first sequence of depth images into second sequence of depth images at the second sequence of viewpoints on the basis of the viewpoint position/posture information; and a program code of presenting to the observer three-dimensional grayscale images or color images generated according to the second depth images.

44. The medium according to claim 43, wherein the individual program codes are stored as standalone program code modules independently of other program code modules.

45. An image processing apparatus using an image measurement apparatus of claim 2.

46. An image processing method using an image measurement apparatus of claim 2.

47. An apparatus according to claim 1, wherein said warping means generates at least one of the second sequence of depth images from a respective one of the first sequence of depth images by approximation method.

48. An apparatus according to claim 2, wherein said warping means generates at least one of the second sequence of depth images from a respective one of the first sequence of depth images by approximation method.

49. A system according to claim 31, wherein said warping means generates at least one of the second sequence of depth images from a respective one of the first sequence of depth images by approximation method.

* * * * *

UNITED STATES PATENT AND TRADEMARK OFFICE
CERTIFICATE OF CORRECTION

| | |
|---|---|
| PATENT NO. | : 6,445,815 B1 |
| APPLICATION NO. | : 09/266859 |
| DATED | : September 3, 2002 |
| INVENTOR(S) | : Kiyohide Sato |

It is certified that error appears in the above-identified patent and that said Letters Patent is hereby corrected as shown below:

IN THE FIGURES:

In Figure 6, "DIMENTIONAL" should read --DIMENSIONAL--.

IN THE DISCLOSURE:

COLUMN 2:

Line 48, "used" should read --use--.

COLUMN 6:

Line 14, "inputs" should read --input--.

COLUMN 7:

Line 39, "view-point" should read --viewpoint--.

COLUMN 8:

Line 5, "At" should read --$\Delta$t--; and
Line 33, "In the" should read --The--.

COLUMN 9:

Line 16, "simple a" should read --a simple--.

COLUMN 10:

Line 61, "$Id_{w)}$" should read --$Id_w$--.

COLUMN 12:

Line 64, "suffices" should be deleted.

UNITED STATES PATENT AND TRADEMARK OFFICE
CERTIFICATE OF CORRECTION

PATENT NO. : 6,445,815 B1
APPLICATION NO. : 09/266859
DATED : September 3, 2002
INVENTOR(S) : Kiyohide Sato It is certified that error appears in the above-identified patent and that said Letters Patent is hereby corrected as shown below:

COLUMN 13:

Line 12, "positions" should read --postures--;
Line 17, "and$\Delta M^L$" should read --and $\Delta M^L$--;
Line 35, "position/" should read --positions/--; and
Line 53, "and$\Delta M^L$" should read --and $\Delta M^L$--.

COLUMN 17:

Line 3, "images" should read --image--.

COLUMN 19:

Line 35, "coordinate" should read --coordinates--;
Line 48, "movements" should read --movement--; and
Line 51, "mation" should read --mations--.

COLUMN 23:

Line 60, "include" should read --includes--.

Signed and Sealed this

Twenty-ninth Day of January, 2008

JON W. DUDAS
*Director of the United States Patent and Trademark Office*